US012293755B2

(12) United States Patent
Akiyama

(10) Patent No.: US 12,293,755 B2
(45) Date of Patent: May 6, 2025

(54) SOUND SHIELDING DEVICE

(71) Applicant: AGC Inc., Tokyo (JP)

(72) Inventor: Jun Akiyama, Tokyo (JP)

(73) Assignee: AGC Inc., Tokyo (JP)

( * ) Notice: Subject to any disclaimer, the term of this patent is extended or adjusted under 35 U.S.C. 154(b) by 149 days.

(21) Appl. No.: 18/357,420

(22) Filed: Jul. 24, 2023

(65) Prior Publication Data

US 2023/0368769 A1 Nov. 16, 2023

Related U.S. Application Data

(63) Continuation of application No. PCT/JP2022/002062, filed on Jan. 20, 2022.

(30) Foreign Application Priority Data

Jan. 25, 2021 (JP) ................................ 2021-009668

(51) Int. Cl.
*G10K 11/178* (2006.01)
*H04R 1/02* (2006.01)
(Continued)

(52) U.S. Cl.
CPC .. *G10K 11/17861* (2018.01); *G10K 11/17854* (2018.01); *G10K 11/17879* (2018.01);
(Continued)

(58) Field of Classification Search
CPC ....... G10K 11/17861; G10K 11/17879; G10K 11/17854; G10K 11/168; H04R 1/025; H04R 2499/13; E06B 5/20
See application file for complete search history.

(56) References Cited

U.S. PATENT DOCUMENTS 5,812,684 A * 9/1998 Mark .................. G10K 11/178 381/71.4
8,792,657 B2 7/2014 Suzuki et al.
(Continued)

FOREIGN PATENT DOCUMENTS

JP H09-288489 A 11/1997
JP 2019-068368 A 4/2019

OTHER PUBLICATIONS

International Search Report with English translation and Written Opinion issued in connection with International Patent Application No. PCT/JP2022/002062, dated Apr. 12, 2022.
(Continued)

*Primary Examiner* — Jason R Kurr
(74) *Attorney, Agent, or Firm* — Foley & Lardner LLP

(57) ABSTRACT

A sound insulation device includes: a glass sheet composite including a plurality of glass plates being laminated, and partitioning an interior space and an exterior space; a vibration output unit vibrating the glass sheet composite according to an input signal; an exterior sound detection unit detecting a sound from a noise source or a vibration source and outputting a reference signal according to a detection result, the sound being correlated with a sound wave vibration induced in the glass sheet composite; an interior sound detection unit detecting a sound in the interior space and outputting an error signal according to a detection result; and a control unit including an adaptive filter that generates a cancel signal having a phase opposite to a phase of the reference signal to minimize the error signal, and outputting the cancel signal from the adaptive filter to the vibration output unit.

20 Claims, 26 Drawing Sheets

(51) Int. Cl.
*E06B 5/20* (2006.01)
*G10K 11/168* (2006.01)

(52) U.S. Cl.
CPC ................ *H04R 1/025* (2013.01); *E06B 5/20* (2013.01); *G10K 11/168* (2013.01); *H04R 2499/13* (2013.01)

(56) References Cited

U.S. PATENT DOCUMENTS

| | | | | |
|---|---|---|---|---|
| 11,290,807 | B2 | 3/2022 | Akiyama et al. | |
| 11,335,312 | B2 * | 5/2022 | Plummer | E06B 5/20 |
| 2006/0162264 | A1 * | 7/2006 | Berkhoff | G10K 11/178 52/144 |
| 2015/0358729 | A1 | 12/2015 | Xu et al. | |
| 2018/0082673 | A1 | 3/2018 | Tzanetos | |
| 2018/0313138 | A1 * | 11/2018 | Carme | E06B 3/66 |
| 2020/0254943 | A1 * | 8/2020 | Gijrath | H04R 7/045 |
| 2021/0314706 | A1 | 10/2021 | Akiyama et al. | |

OTHER PUBLICATIONS

European Extended Search Report issued in corresponding European Patent Application No. 22742661.6 dated Nov. 15, 2024.

* cited by examiner

SOUND SHIELDING DEVICE

CROSS-REFERENCE TO RELATED APPLICATIONS

This is a bypass continuation of International Patent Application No. PCT/JP2022/002062, filed on Jan. 20, 2022, which claims priority to Japanese Patent Application No. 2021-009668, filed on Jan. 25, 2021. The contents of these applications are hereby incorporated by reference in their entireties.

TECHNICAL FIELD

The present disclosure relates to a sound insulation device.

BACKGROUND ART

In the related art, there is known a vehicle interior noise reduction device that reduces noise in a vehicle interior by detecting a sound of a noise source generated from a vehicle tire or the like and outputting a sound in a phase opposite to that of the detected sound (Patent Literature 1).

In the vehicle interior noise reduction device disclosed in Patent Literature 1, a reference signal in which a noise frequency is detected is output by a first microphone disposed in the vehicle interior, and, according to the reference signal, a sound having the same amplitude as that of the detected noise and having a phase opposite to the detected noise is generated from a speaker disposed in a headrest toward the vehicle interior as an anti-phase sound (a secondary sound). On the other hand, a second microphone disposed in the vicinity of the speaker detects a residual noise in the vehicle interior, and inputs a detected error signal to a control unit. Based on the reference signal and the error signal, the control unit updates a coefficient of an adaptive filter using an adaptive algorithm to minimize the error signal, thereby controlling the anti-phase sound output from the speaker.

According to the vehicle interior noise reduction device, the noise heard by a passenger in the vehicle interior is reduced by outputting the anti-phase sound of the noise from the speaker incorporated in the headrest.

Patent Literature 1: JPH09-288489A

SUMMARY OF INVENTION

However, in a device that outputs an anti-phase sound of a noise by using a general speaker that drives a vibrating body such as a cone paper, even if a noise in a relatively low-frequency band in an audible range can be effectively reduced, a noise reduction in a medium-to-high-frequency band is poor. For example, a noise having a relatively high frequency exceeding 150 Hz is likely to enter the vehicle interior through a window, and such noise is also desired to be reduced.

Accordingly, an object of the present disclosure is to provide a sound insulation device and a sound insulation method capable of blocking a noise in a wide frequency band including a high-frequency band and satisfactorily reducing a noise in an interior.

The present disclosure has the following configuration.

(1) A sound insulation device including:

a glass sheet composite including a plurality of glass plates being laminated, including an intermediate layer between at least a pair of glass plates among the glass plates, and partitioning an interior space and an exterior space;

a vibration output unit being fixed to the glass sheet composite and vibrating the glass sheet composite according to an input signal;

an exterior sound detection unit detecting a sound from a noise source or a vibration source and outputting a reference signal according to a detection result, the sound being correlated with a sound wave vibration induced in the glass sheet composite;

an interior sound detection unit detecting a sound in the interior space and outputting an error signal according to a detection result; and a control unit including an adaptive filter that generates a cancel signal having a phase opposite to a phase of the reference signal to minimize the error signal, and outputting the cancel signal from the adaptive filter to the vibration output unit.

(2) A sound insulation method of vibrating a glass sheet composite according to an input signal, the glass sheet composite including a plurality of glass plates being laminated, including an intermediate layer between at least a pair of glass plates among the glass plates, and partitioning an interior space and an exterior space, the sound insulation method including:

detecting a sound from a noise source or a vibration source and outputting a reference signal according to a detection result, the sound being correlated with a sound wave vibration induced in the glass sheet composite;

detecting a sound in the interior space and outputting an error signal according to a detection result; and generating, by an adaptive filter, a cancel signal having a phase opposite to a phase of the reference signal to minimize the error signal, and vibrating the glass sheet composite according to the cancel signal from the adaptive filter.

According to the present disclosure, a noise in a wide frequency band including a high-frequency band can be blocked, and the noise can be satisfactorily reduced in an interior.

BRIEF DESCRIPTION OF DRAWINGS

Each of FIGS. 7A and 7B is a diagram illustrating a difference between a general noise reduction device and the sound insulation device including the glass sheet composite.

Each of FIGS. 9A to 9C is a diagram illustrating a sound insulation device in which a sound-absorbing material is provided in a surrounding member.

Figure 16A:
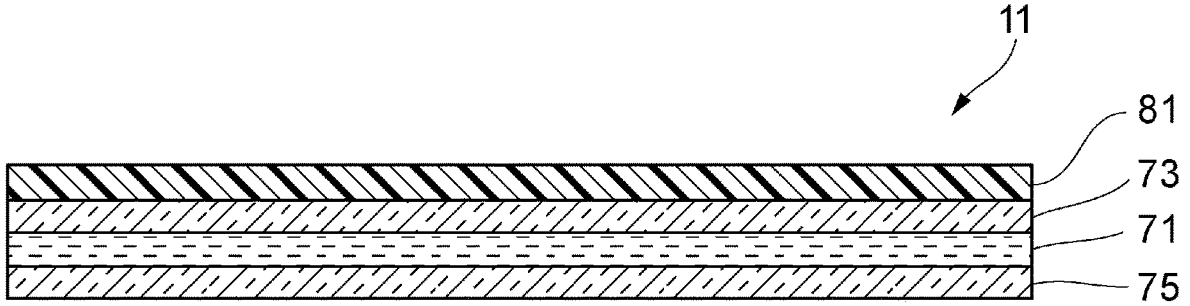
Figure 16B:
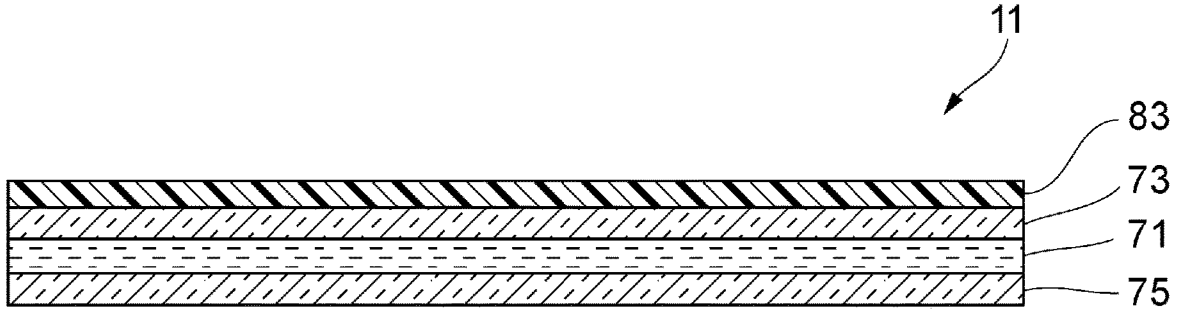

Each of FIGS. 16A and 16B is a cross-sectional view illustrating another example of the glass sheet composite.

Figure 17:
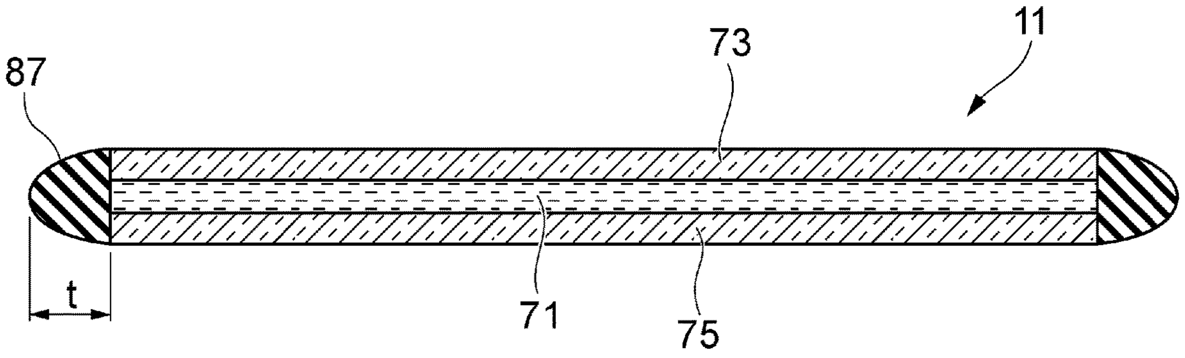

FIG. 17 is a cross-sectional view illustrating the glass sheet composite in which a sealing material is provided on an edge portion.

Figure 18:
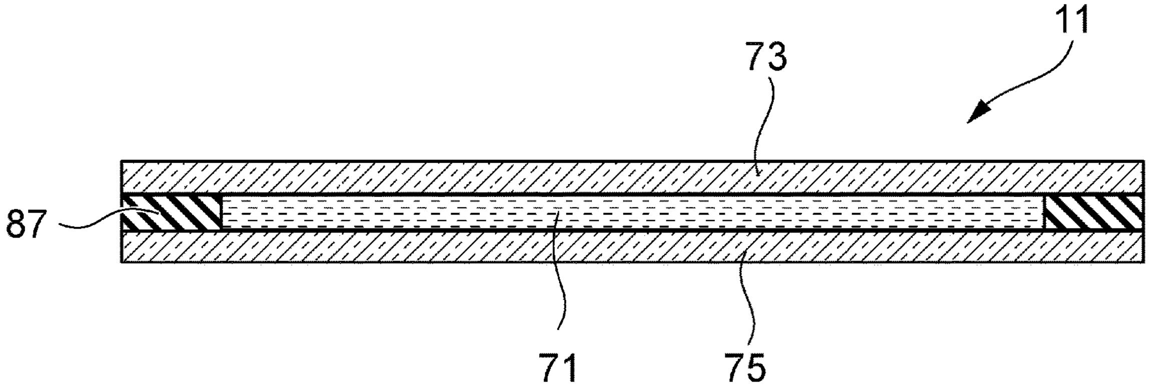

FIG. 18 is a cross-sectional view illustrating the glass sheet composite in which the sealing material is provided on at least a part of a surface of a glass plate facing the glass sheet composite.

Figure 19A:
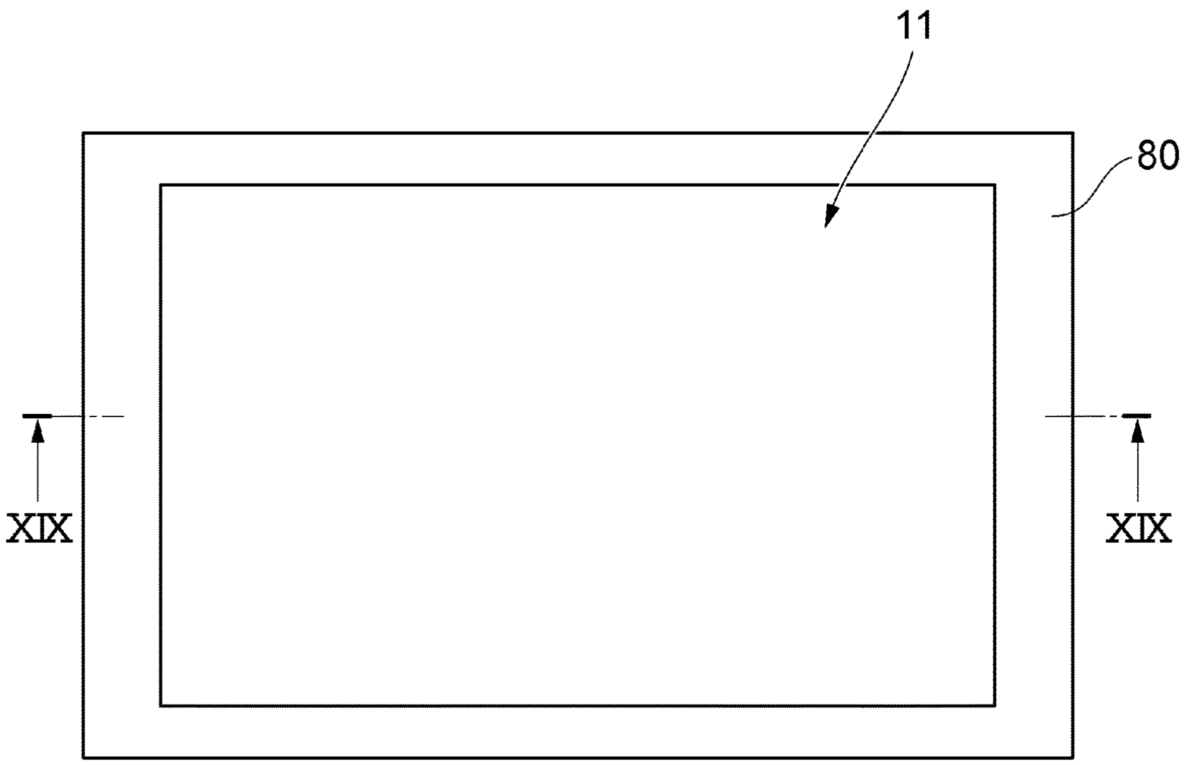
Figure 19B:
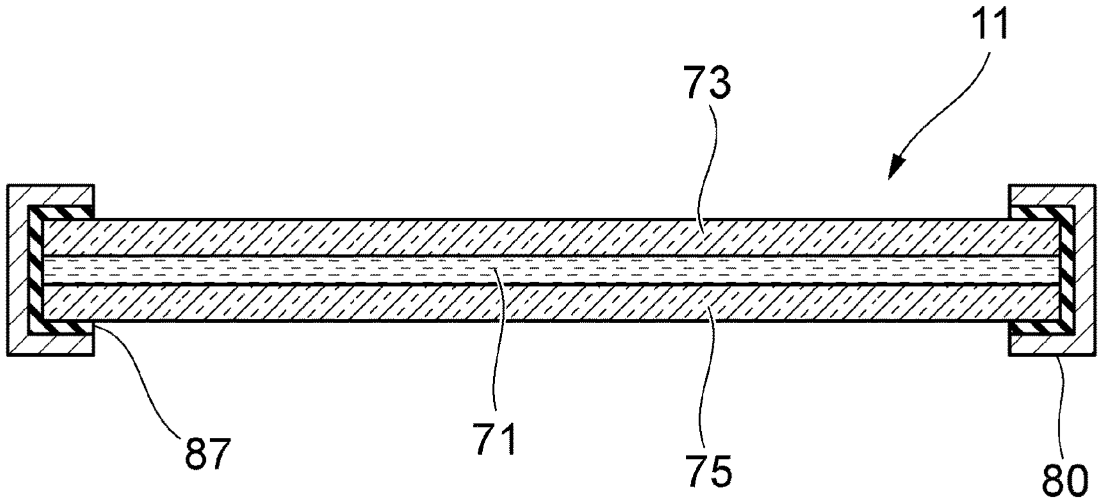

FIG. 19A is a plan view illustrating another embodiment of the glass sheet composite, and FIG. 19B is a cross-sectional view taken along the line XIX-XIX in of FIG. 19A.

Figure 20A:
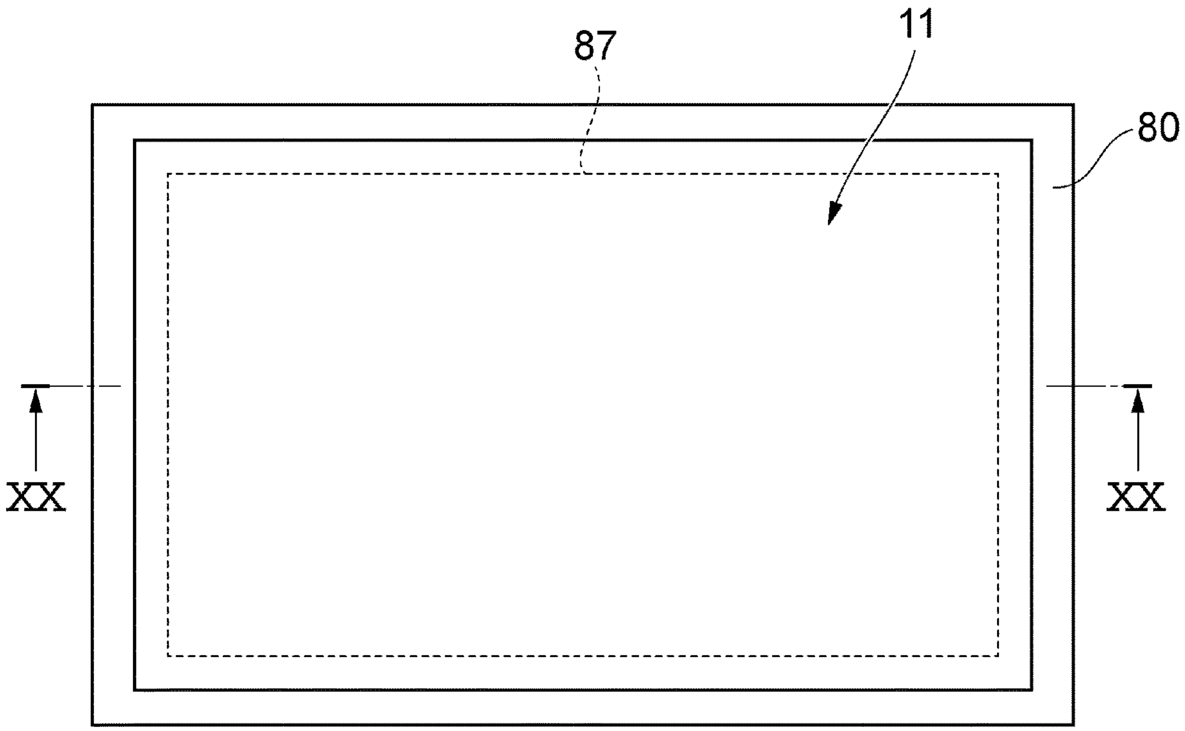
Figure 20B:
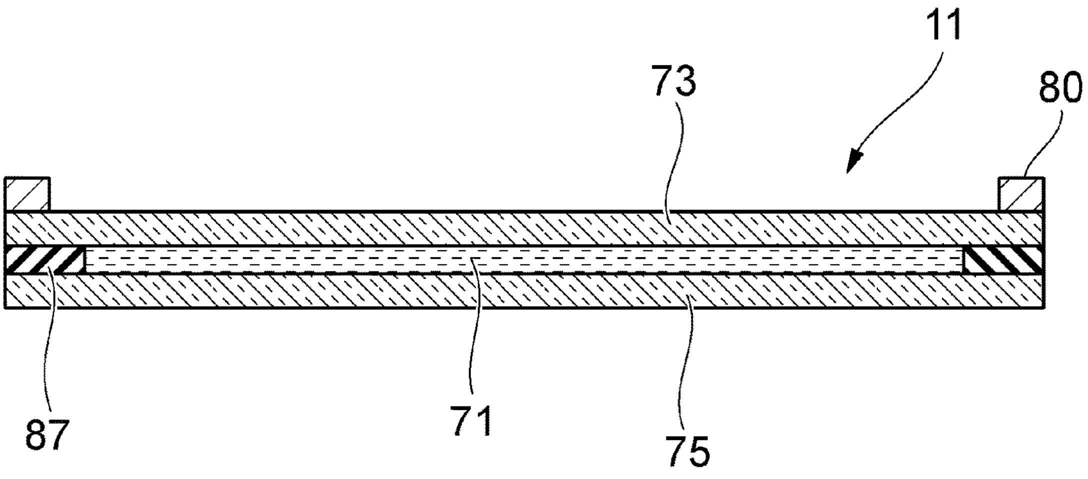

FIG. 20A is a plan view illustrating another embodiment of the glass sheet composite, and FIG. 20B is a cross-sectional view taken along the line XX-XX in FIG. 20A.

Figure 21A:
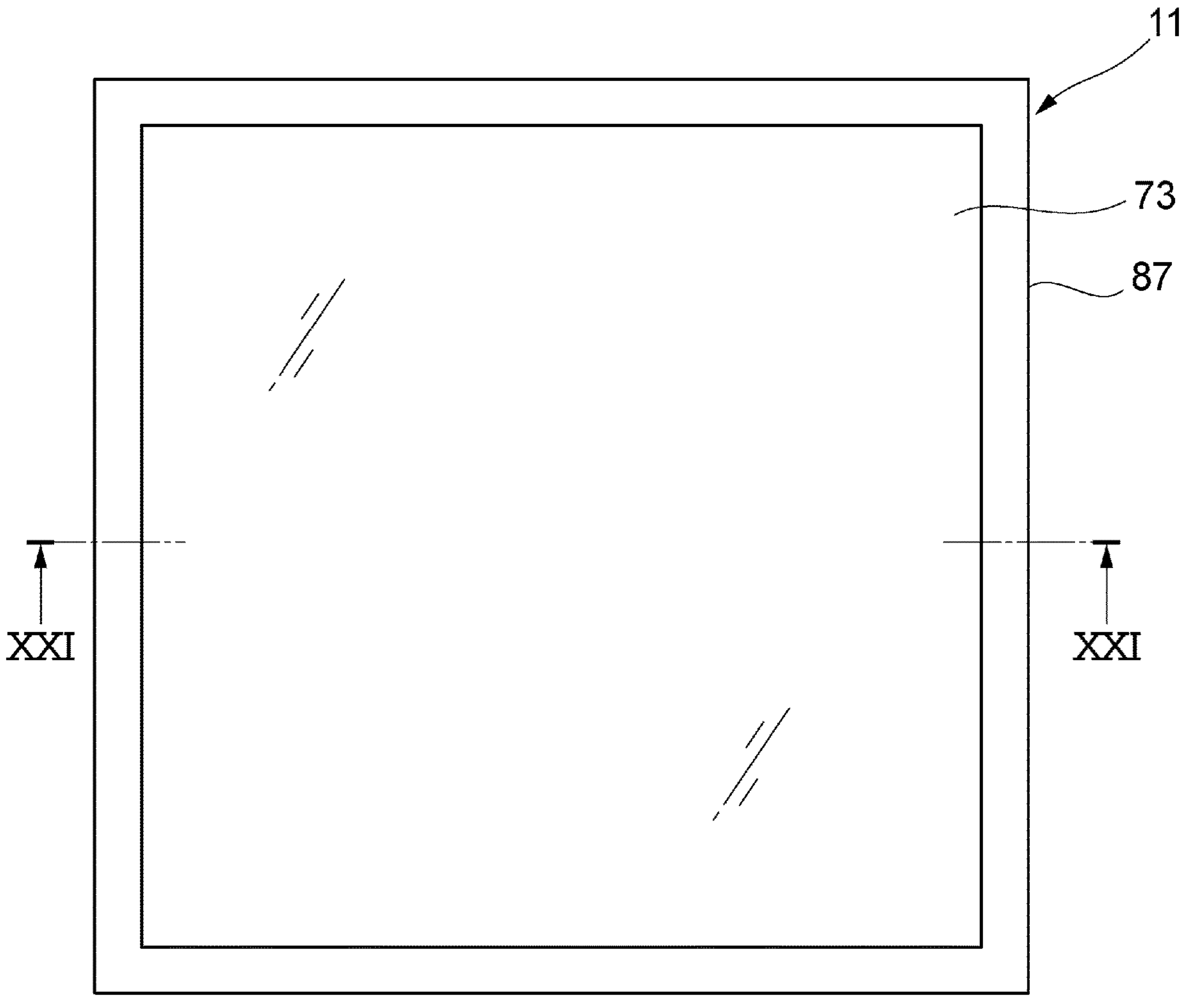
Figure 21B:
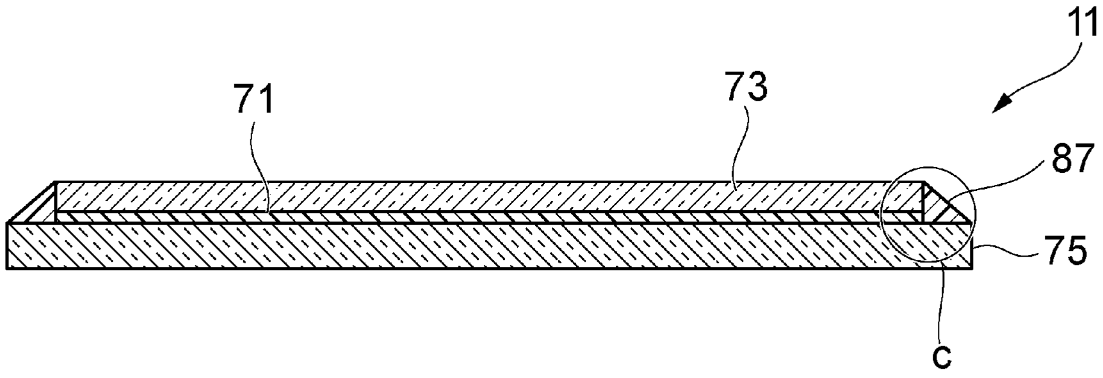
Figure 21C:
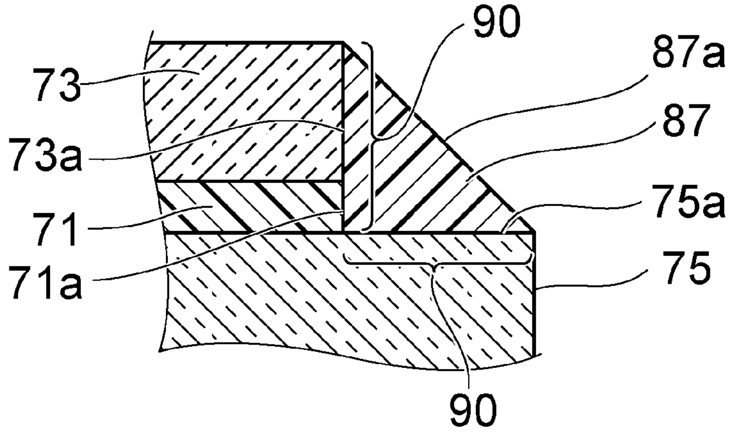

FIG. 21A is a plan view illustrating another embodiment of the glass sheet composite, FIG. 21B is a cross-sectional view taken along the line XXI-XXI in FIG. 21A, and FIG. 21C is an enlarged view of the portion C in FIG. 21B.

Figure 22A:
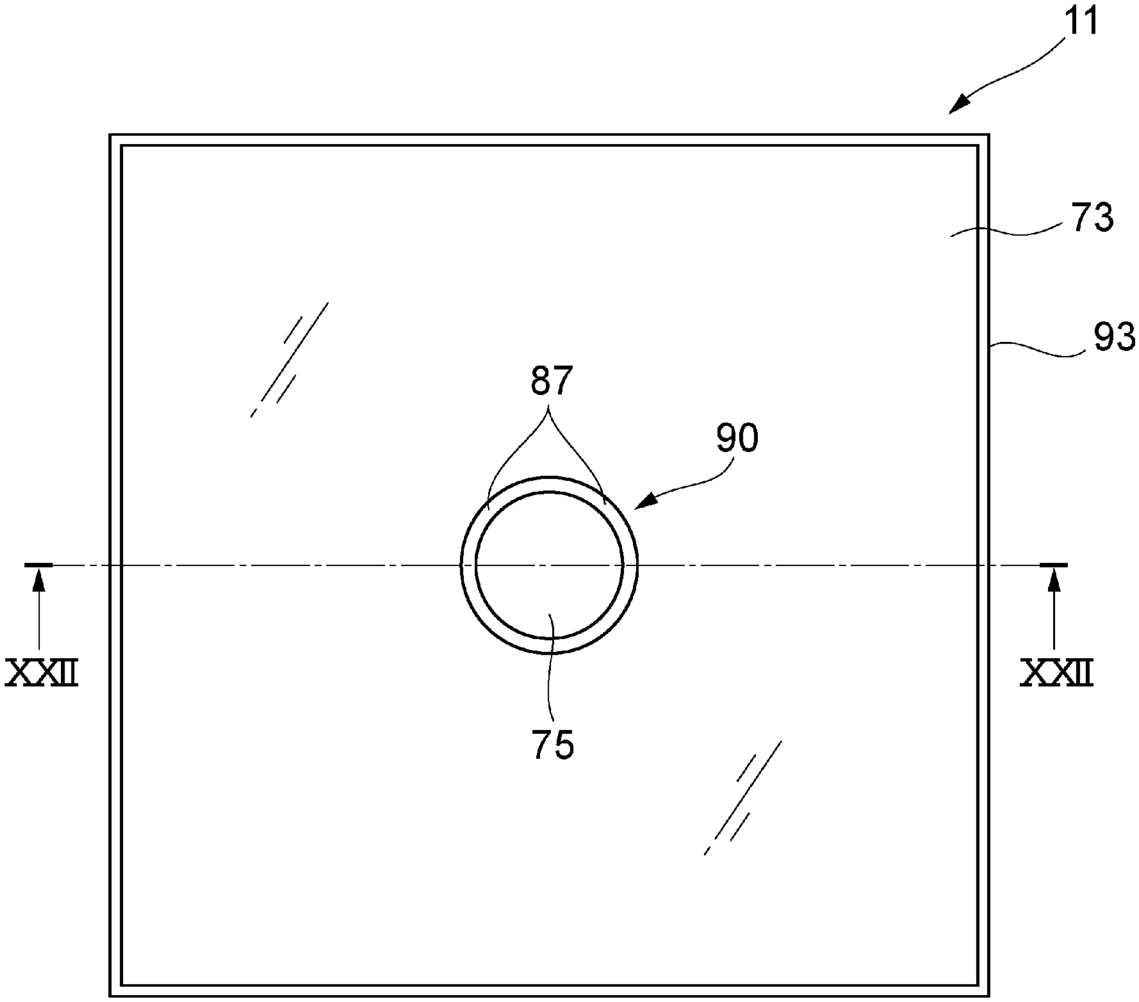
Figure 22B:
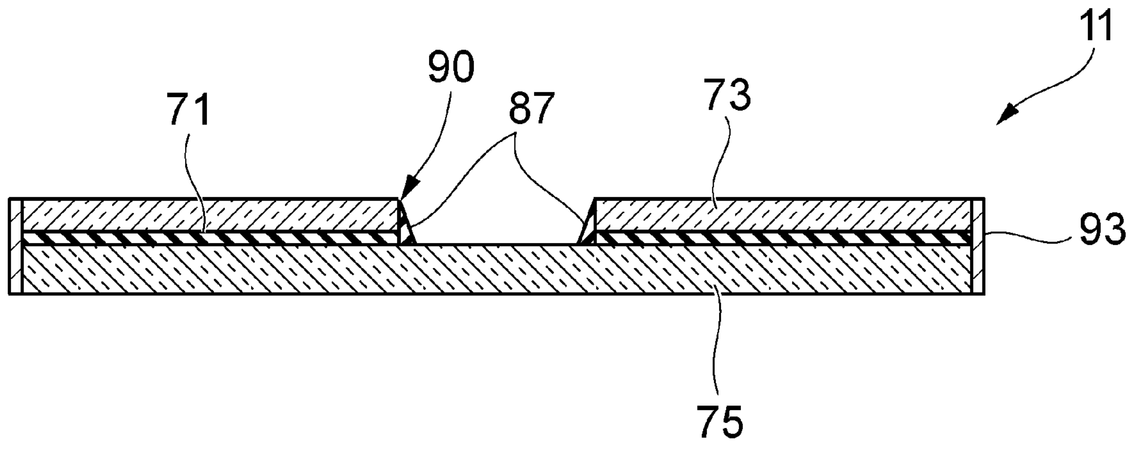

FIG. 22A is a plan view illustrating another embodiment of the glass sheet composite, and FIG. 22B is a cross-sectional view taken along the line XXII-XXII in FIG. 22A.

Figure 23:
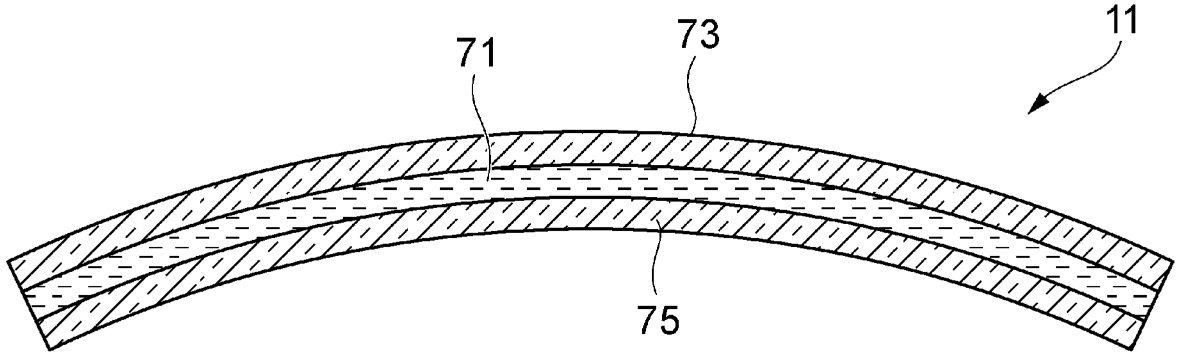

FIG. 23 is a cross-sectional view illustrating a curved glass sheet composite.

Figure 24A:
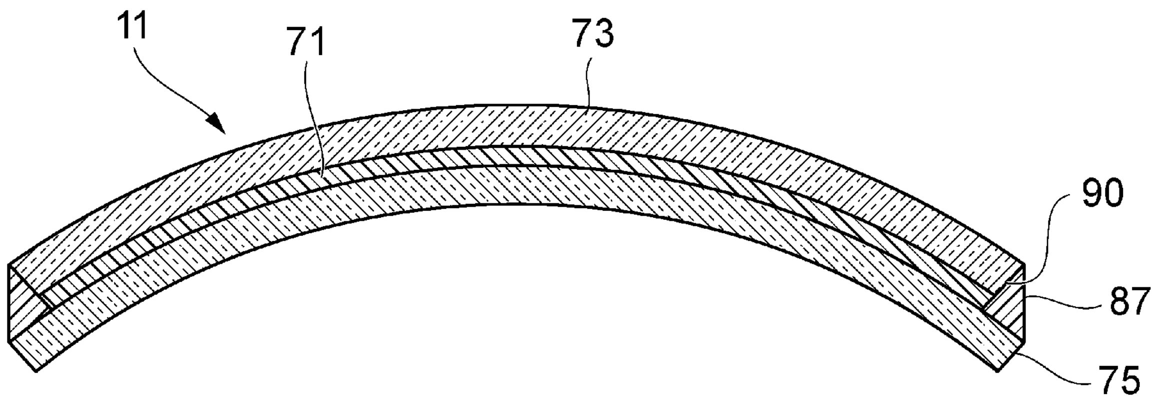
Figure 24B:
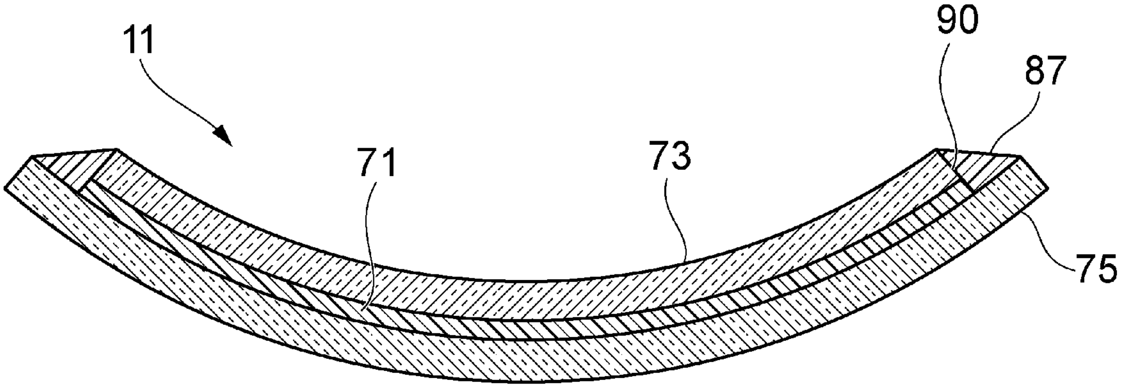

Each of FIGS. 24A and 24B is a diagram illustrating the glass sheet composite having a stepped portion on an edge portion. FIG. 24A is a cross-sectional view illustrating a state in which the glass sheet composite is curved in a concave shape, and FIG. 24B is a cross-sectional view illustrating a state in which the glass sheet composite is curved in a convex shape.

DESCRIPTION OF EMBODIMENTS

Hereinafter, embodiments of the present disclosure will be described in detail with reference to the drawings.

The present disclosure achieves an effective sound insulation control in a wide band by reducing both a noise in a low-frequency band and a noise in a medium-to-high-frequency band by vibration of a glass sheet composite. In the following embodiments, a window of a vehicle and a window of a house will be described as an example of the glass sheet composite, and an application target is not limited thereto.

Figure 1:
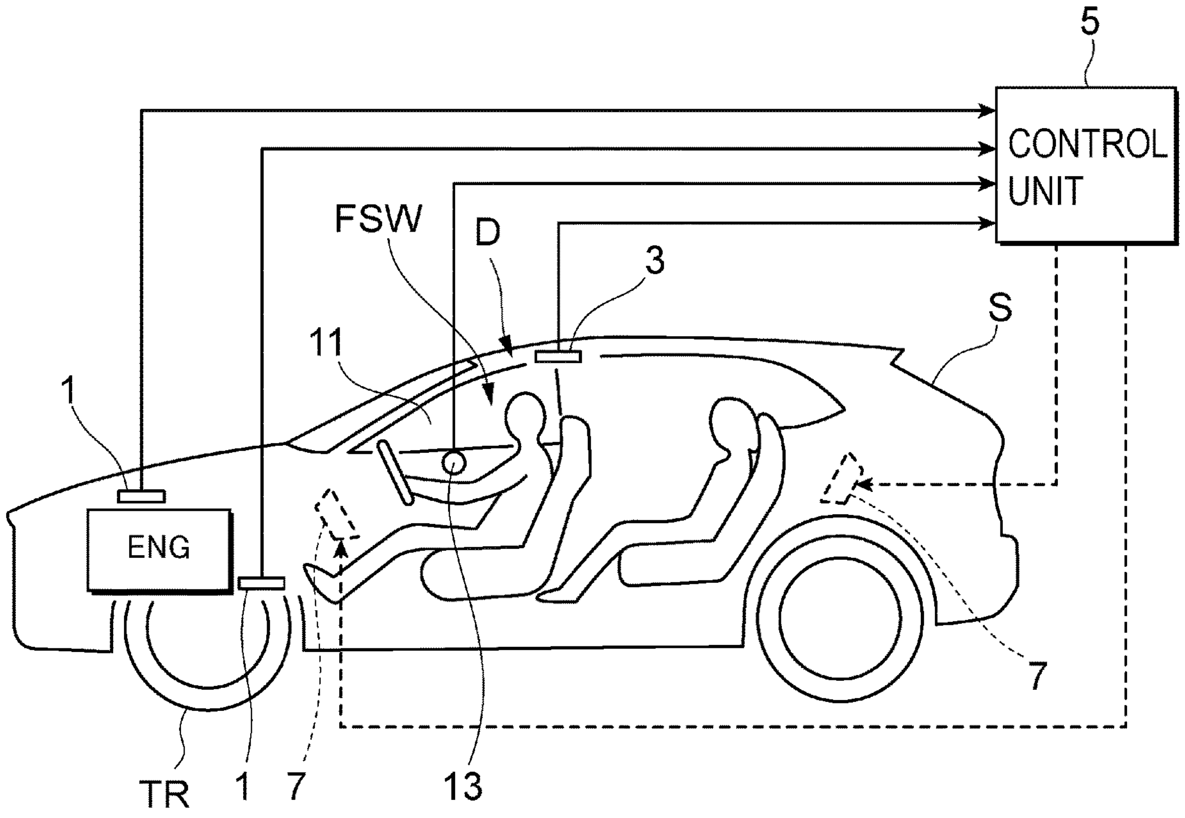
FIG. 1 is a schematic configuration diagram of a vehicle to which a sound insulation device is applied.
Figure 2:
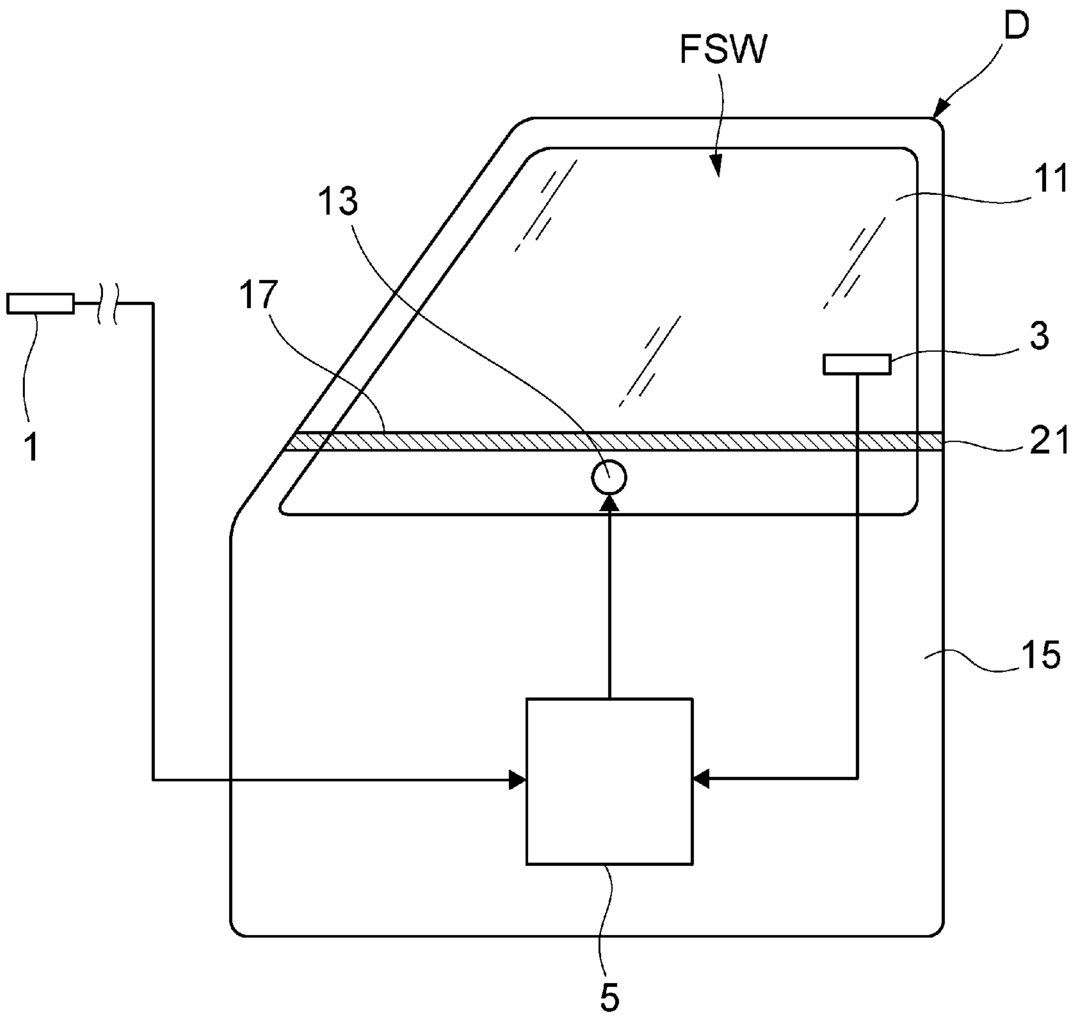
FIG. 2 is a schematic configuration diagram of a door of the vehicle to which the sound insulation device is applied.

FIG. 1 is a schematic configuration diagram of a vehicle S to which a sound insulation device is applied. FIG. 2 is a schematic configuration diagram of a door D of the vehicle S to which the sound insulation device is applied.

As illustrated in FIG. 1, the sound insulation device is incorporated in the vehicle S, and insulates a sound of a transmission path that is transmitted from an exterior of the vehicle S to an interior of the vehicle S.

As illustrated in FIGS. 1 and 2, the sound insulation device includes a glass sheet composite 11, a vibration output unit 13, an exterior sound detection unit 1, an interior sound detection unit 3, and a control unit 5. Each of the vibration output unit 13, the exterior sound detection unit 1, and the interior sound detection unit 3 is connected to the control unit 5. In addition, in the vehicle S, acoustic speakers 7 forming an audio system are provided in an interior, and these acoustic speakers 7 are also connected to the control unit 5.

The glass sheet composite 11 is provided on the door D of the vehicle S, and is used as a front side window FSW that separates an interior space and an exterior space of the vehicle S.

The vibration output unit 13 is, for example, a voice coil motor and is attached to the glass sheet composite 11. The vibration output unit 13 vibrates in response to a drive signal input from the control unit 5, and applies the vibration to the glass sheet composite 11.

The exterior sound detection unit 1 is, for example, a microphone. The exterior sound detection unit 1 detects a sound from a noise source or a vibration source which is correlated with a sound wave vibration induced in the glass sheet composite 11, and outputs a reference signal according to a detection result. Specifically, the exterior sound detection unit 1 is provided in an engine room of the vehicle S and detects a sound emitted from an engine ENG. The exterior sound detection unit 1 is also provided in a tire house of the vehicle S, and detects a sound such as road noise from a tire TR generated during traveling. Each of signals of the sounds detected by the exterior sound detection unit 1 is transmitted to the control unit 5 as the reference signal. The exterior sound detection unit 1 may be a vibration sensor, an optical sensor, or the like that detects the number of revolutions of the engine ENG, and in this case, information on the number of revolutions of the engine ENG is transmitted from the exterior sound detection unit 1 to the control unit 5 as the reference signal.

The interior sound detection unit 3 is, for example, a microphone, is provided in the interior of the vehicle S, and detects the sound in the interior. It is preferable that the interior sound detection unit 3 be disposed in the vicinity of the glass sheet composite 11 and ears of a passenger in the interior, or worn on the ears of the passenger. In the case where the interior sound detection unit 3 is worn on the ears of the passenger, it is more preferable that the interior sound detection unit 3 be a wireless microphone. A signal of the sound detected by the interior sound detection unit 3 is transmitted to the control unit 5 as an error signal.

The door D of the vehicle S including the glass sheet composite 11 includes a surrounding member 15 that supports the glass sheet composite 11. A region where the vibration output unit 13 is fixed to the glass sheet composite 11 is accommodated inside the surrounding member 15. The surrounding member 15 includes an opening 21, and supports the glass sheet composite 11 by exposing a region where the vibration output unit 13 is not fixed to the glass sheet composite 11 to the outside from the opening 21. The surrounding member 15 is provided with a shielding member 17 in the opening 21, and the opening 21 is acoustically shielded from the glass sheet composite 11 by the shielding member 17.

Here, a basic configuration of the sound insulation device will be described.

Figure 3:
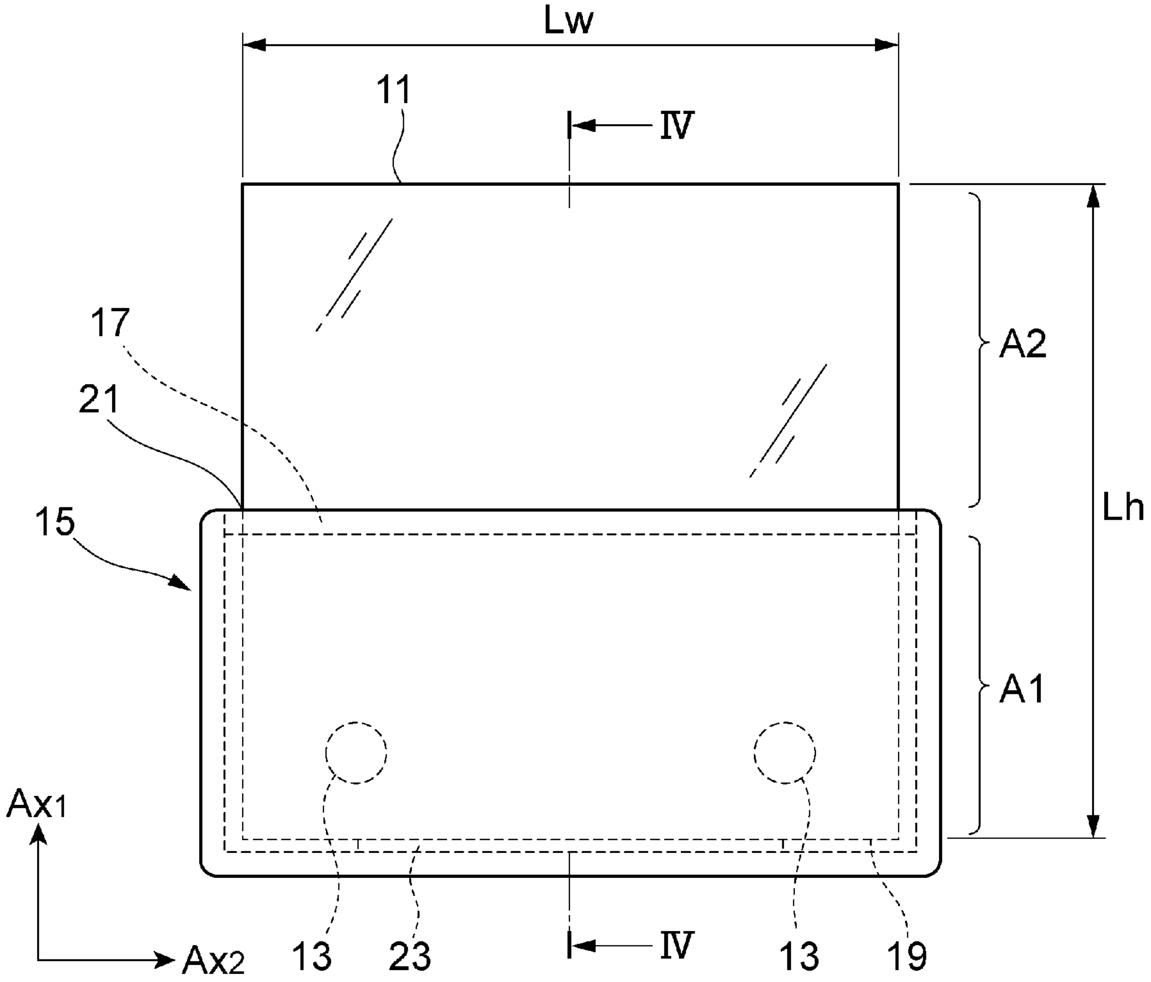
FIG. 3 is a front view of the sound insulation device illustrating a configuration of the sound insulation device.
Figure 4:
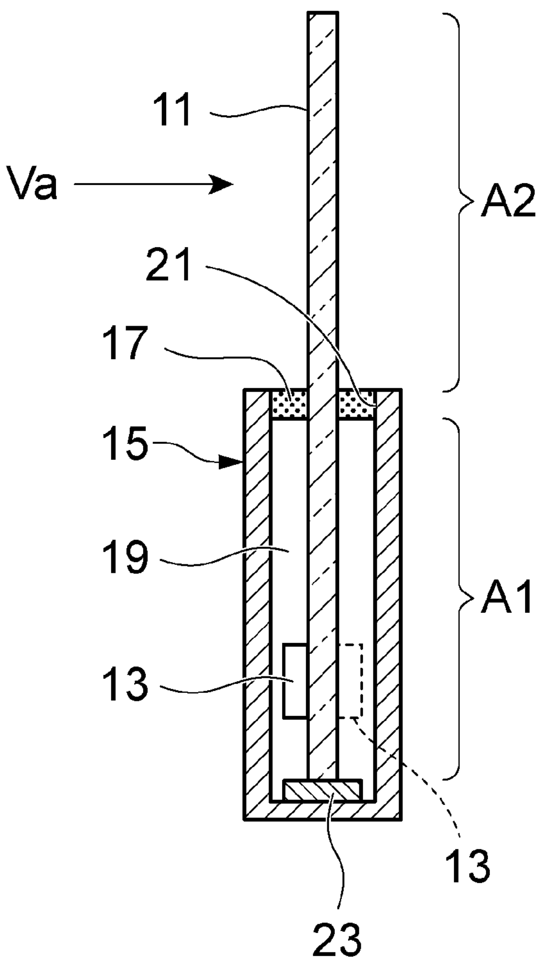
FIG. 4 is a cross-sectional view taken along the line IV-IV illustrated in FIG. 3.
Figure 5:
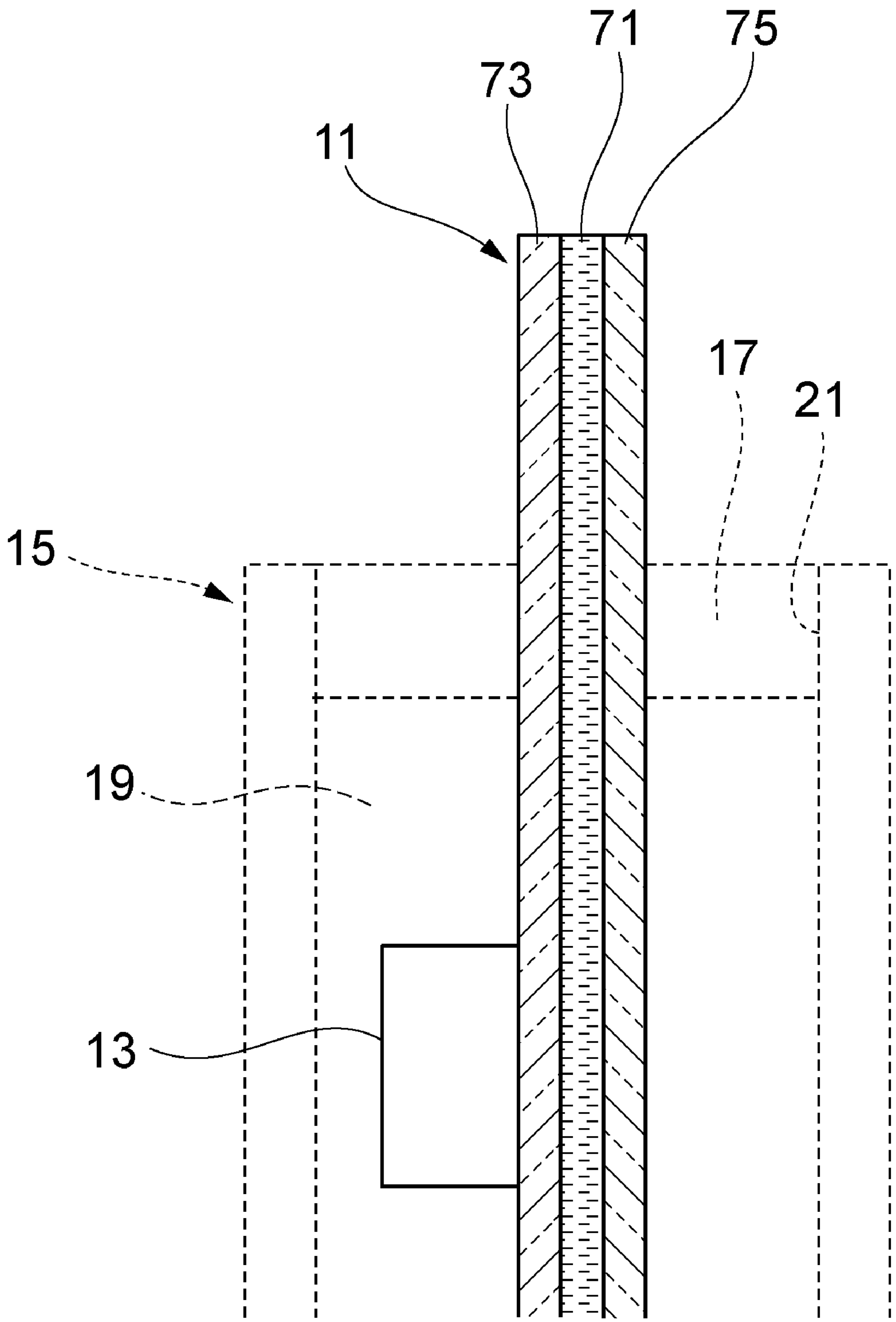
FIG. 5 is a partial cross-sectional view illustrating a state in which a vibration output unit is attached to a glass sheet composite.

FIG. 3 is a front view of the sound insulation device illustrating the configuration of the sound insulation device. FIG. 4 is a cross-sectional view taken along the line IV-IV illustrated in FIG. 3. FIG. 5 is a partial cross-sectional view illustrating a state in which the vibration output unit 13 is attached to the glass sheet composite 11.

As illustrated in FIGS. 3 and 4, the glass sheet composite 11 is supported by the surrounding member 15. The glass sheet composite 11 is excited by the vibration generated by the vibration output unit 13 to generate a sound. When viewed from an arrow Va direction in FIG. 4, the glass sheet composite 11 may have a light-transmitting property in which the other side can be seen through the glass sheet composite 11, and may have a light-shielding property, or a selective light-transmitting property such as an optical filter such as a band-pass filter or a surface treatment layer whose surface is formed as a light diffusion surface.

In the glass sheet composite 11, a plurality of glass plates are laminated, and an intermediate layer is provided between the glass plates. As illustrated in FIG. 5, the glass sheet composite 11 according to the embodiment is formed by laminating a pair of glass plates 73 and 75 and includes an intermediate layer 71 between the glass plates 73 and 75. The glass sheet composite 11 is preferably made of a material having a high longitudinal wave sound velocity value, and is made of, for example, a material such as a glass, light-transmissive ceramics, or a single crystal such as sapphire. The glass sheet composite 11 has an outer shape conforming to the front side window FSW of the vehicle S, and is not limited thereto, and may have another outer shape such as a rectangular shape.

The vibration output unit 13 is fixed to the glass sheet composite 11, and vibrates the glass sheet composite 11 in accordance with the input drive signal. The vibration output unit 13 includes, for example, a coil unit, a magnetic circuit unit, and a vibration unit coupled to the coil unit or the magnetic circuit unit. In the vibration output unit 13, in the case where the drive signal from the control unit 5 is input to the coil unit, a vibration occurs in the coil unit or the magnetic circuit unit due to an interaction between the coil unit and the magnetic circuit unit. The vibration of the coil unit or the magnetic circuit unit is transmitted to the vibration unit, and is transmitted from the vibration unit to the glass sheet composite 11.

At least one, preferably a plurality of vibration output units 13, is attached to the glass sheet composite 11. For example, two vibration output units 13 may be attached to one main surface of the glass sheet composite 11 at intervals along one side of an outer edge of the glass sheet composite 11. The vibration output unit 13 may be provided on each of one main surface and the other main surface of the glass sheet composite 11, as the vibration output unit 13 indicated by the dotted line in FIG. 4.

The surrounding member 15 of the door D of the vehicle S is formed in a box shape surrounding a portion including a fixed position of the vibration output unit 13 of the glass sheet composite 11. The surrounding member 15 defines an internal space 19 including the vibration output unit 13 and a part of the glass sheet composite 11. The other part of the glass sheet composite 11 is exposed to the outside of the internal space 19 from the opening 21 of the internal space 19 formed in the surrounding member 15. That is, one end of the glass sheet composite 11 is exposed to the outside of the internal space 19 from the opening 21 of the internal space 19. The above-described one end of glass sheet composite 11 means, of an end portion of the glass sheet composite 11 on a side close to the fixed position of the vibration output unit 13 and an end portion of the glass sheet composite 11 on a far side from the fixed position, the end portion on the far side.

The shielding member 17 provided in the opening 21 of the surrounding member 15 makes the internal space 19 a closed space, and divides the glass sheet composite 11 into an excitation region A1 provided with the vibration output unit 13 inside the internal space 19 and a vibration region A2 outside the internal space 19.

As the shielding member 17, a hydrocarbon composition, a silicone composition, a general polymeric material which is a fluorine-containing composition, and general rubber can be used. However, a material having a storage elastic modulus G of $1.0\times10^2$ Pa to $1.0\times10^{10}$ Pa when a dynamic viscoelasticity of a sheet molded to a thickness of 1 mm is measured at 25° C., a frequency of 1 Hz, and a compression mode is preferred. In particular, the storage elastic modulus G is more preferably $1.0\times10^3$ Pa to $1.0\times10^8$ Pa. The "shielding" by the shielding member 17 described above refers to a state in which the shielding member 17 is in contact with the glass sheet composite 11 to allow a fine movement in a micrometer unit without completely fixing the glass sheet composite 11. Accordingly, a sound leakage from the internal space 19 is prevented.

In the configuration, a support member 23 that supports the glass sheet composite 11 on the surrounding member 15 is provided between a drive mechanism (not illustrated) for elevating and lowering the glass sheet composite 11 provided in a bottom portion of the internal space 19 of the surrounding member 15 or the internal space 19 and a part of the excitation region A1 of the glass sheet composite 11. The support member 23 is made of an elastic sheet such as rubber, felt, or sponge, which has cushioning properties.

The glass sheet composite 11 constituting the front side window FSW of the vehicle S can be relatively moved to the surrounding member 15 by a drive mechanism (not illustrated) provided in the surrounding member 15. That is, the window of the vehicle S can be opened and closed by moving the front side window FSW formed of the glass sheet composite 11. Therefore, in the case where the window is closed by the glass sheet composite 11, the interior and the exterior are partitioned, and a sound insulation effect in the interior is obtained. That is, by the relative movement of the glass sheet composite 11 with respect to the surrounding member 15, the sound insulation effect in the interior is selectively obtained. Each of FIGS. 3 and 4 illustrates a configuration in which the glass sheet composite 11 can relatively move in the Ax1 direction illustrated in FIG. 3, illustrates a fully open state in which the window of the vehicle S is opened most, and is also in a state same as a state illustrated in FIG. 9A, FIG. 9B, and FIG. 9C, which will be described later. Further, the support member 23 has an effect of preventing a mechanical damage on a lower side of the glass sheet composite 11 in a state in which the window of the vehicle S is fully opened. Although the sound insulation device can exhibit the sound insulation effect irrespective of a fully open state, a fully closed state, or a half-open state of the window of the vehicle S, the sound insulation effect can be remarkably exhibited in a state in which the window of the vehicle S is fully closed.

As illustrated in FIG. 3, in the case where a direction in which the glass sheet composite 11 protrudes from the internal space 19 inside the surrounding member 15 to the outside of the internal space 19 is defined as a first direction Ax1 and a direction orthogonal to the first direction in a plate surface is defined as a second direction Ax2, a maximum width Lw of the glass sheet composite 11 in the second direction Ax2 is preferably equal to or greater than a maximum width Lh thereof in the first direction Ax1 (Lw≥Lh). Accordingly, in the vibration region A2 of the glass sheet composite 11, a distance from the vibration output unit 13 disposed in the excitation region A1 of the glass sheet composite 11 does not become excessively long over the entire vibration region A2, and the vibration from the vibration output unit 13 is propagated to the vibration region A2 with a sufficient strength.

With the above-described configuration, as illustrated in FIG. 4, the glass sheet composite 11 is attached to the vibration output unit 13, and the excitation region A1 disposed in the internal space 19 of the surrounding member 15 and the vibration region A2 disposed outside the internal space 19 and contributing to an acoustic radiation are divided by the shielding member 17. Therefore, a sound generated from the excitation region A1 due to the vibration from the vibration output unit 13 is attenuated in the internal space 19. In addition, the opening 21 of the internal space 19 is acoustically shielded from the glass sheet composite 11 by the shielding member 17, thereby preventing the sound from the excitation region A1 generated in the internal space 19 from leaking to the outside of the internal space 19.

That is, when the vibration of the vibration output unit 13 in the excitation region A1 is propagated to the vibration region A2 and an acoustic radiation is performed from the vibration region A2, it is possible to prevent the sound (the noise) generated in the excitation region A1 from being superimposed on the sound from the vibration region A2. That is, one continuous glass sheet composite 11 is divided into the excitation region A1 and the vibration region A2, and the excitation region A1 is defined in the internal space 19 formed by the surrounding member 15 and the shielding member 17. In this way, the noise generated from the excitation region A1 is confined in the internal space 19, the sound leakage from the internal space 19 is prevented, and an unnecessary noise generated from the excitation region A1 due to the vibration of the vibration output unit 13 is prevented from being transmitted to a sound receiver as an air propagation sound. As a result, it is possible to prevent a decrease in directivity due to wraparound of the sound. In addition, since the sound is radiated to the surroundings only from the vibration region A2 of the glass sheet composite 11, a sound pressure distribution due to the acoustic radiation can be made uniform.

Here, when an area of the excitation region A1 of the glass sheet composite 11 is Ss and an area of the vibration region of the glass sheet composite 11 is Sv, an area ratio Ss/Sv is preferably 0.01 or more and 1.0 or less. The area ratio is more preferably 0.02 or more and 0.5 or less, still more preferably 0.05 or more and 0.1 or less.

In the case where the area of the excitation region A1 is too wide compared to the area of the vibration region A2, efficiency of sound pressure generation is reduced, and in the case where the area of the excitation region A1 is too narrow, an efficient excitation driving cannot be achieved. Therefore, by setting the area ratio to the above range, the acoustic radiation from the vibration region A2 corresponding to the vibration of the vibration output unit 13 can be performed with high efficiency.

A total area (an area of one main surface) of the glass sheet composite 11 is preferably 0.01 $m^2$ or more. The total area is more preferably 0.1 $m^2$ or more, still more preferably 0.3 $m^2$ or more. By setting the total area of the glass sheet composite 11 to be equal to or larger than the above area, it is easy to obtain an effect of making the sound pressure distribution uniform and preventing the decrease in the directivity by dividing the glass sheet composite 11 into the excitation region A1 and the vibration region A2.

Figure 6:
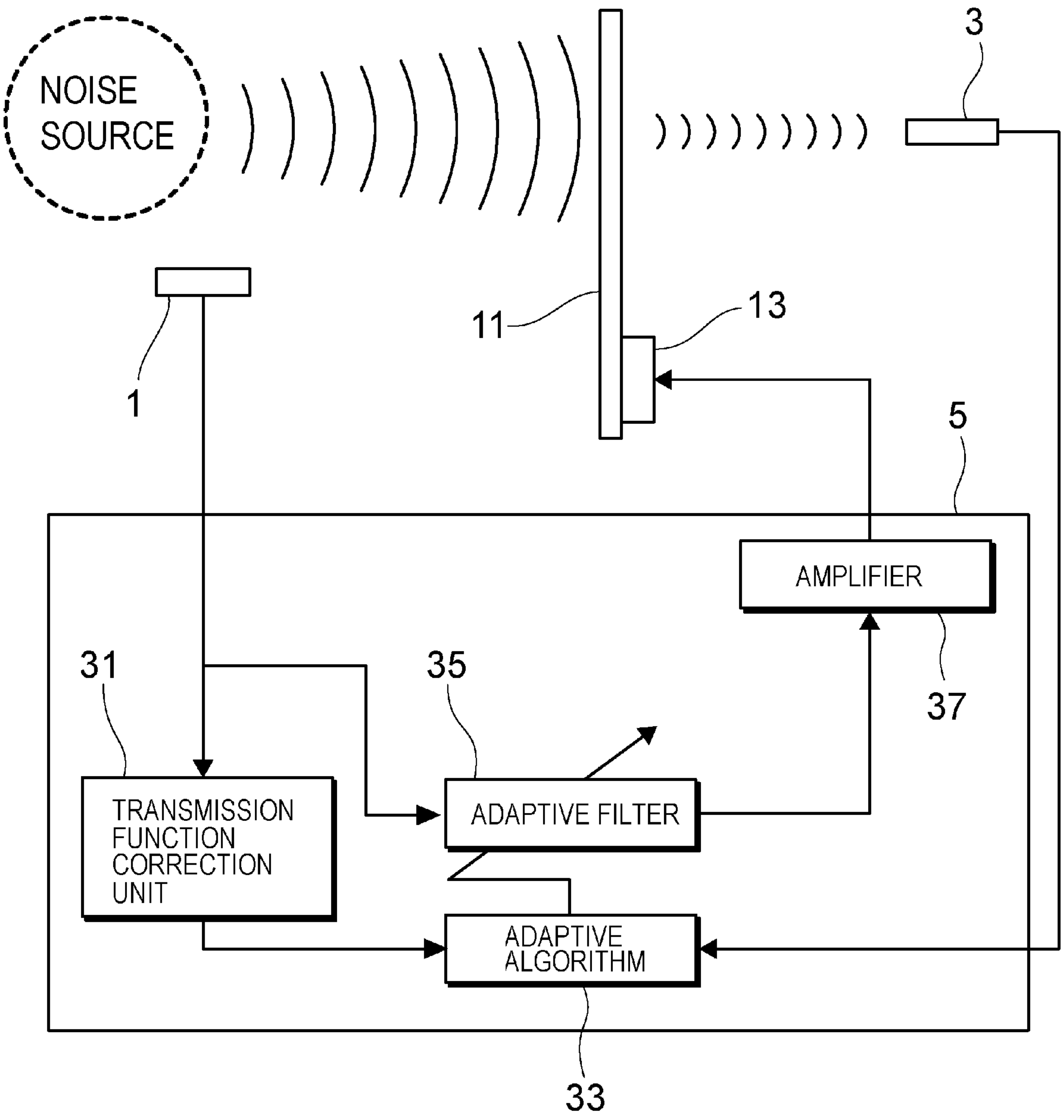
FIG. 6 is a functional block diagram of the sound insulation device applied to the vehicle.

FIG. 6 is a functional block diagram of the sound insulation device applied to the vehicle S.

As illustrated in FIG. 6, the control unit 5 includes a transmission function correction unit 31, an adaptive algorithm 33, an adaptive filter 35, and an amplifier 37. Although not illustrated, the control unit 5 includes a microcomputer including a processor such as a CPU, a memory such as a ROM and a RAM, and a storage.

The adaptive algorithm 33 and the adaptive filter 35 generate a cancel signal having a phase opposite to that of the reference signal transmitted from the exterior sound detection unit 1. The adaptive algorithm 33 and the adaptive filter 35 generate the cancel signal such that the error signal transmitted from the interior sound detection unit 3 is minimum. The cancel signal generated by the adaptive algorithm 33 and the adaptive filter 35 is amplified by the amplifier 37 and transmitted to the vibration output unit 13. In the adaptive algorithm 33, for example, an error is estimated by a least squares method. In the adaptive filter 35, a filter coefficient is appropriately updated by the adaptive algorithm 33 according to a level of the error signal.

The transmission function correction unit 31 obtains a transmission function in a secondary path which is a transmission path of a noise between the glass sheet composite 11 to which the vibration output unit 13 as a secondary sound source is attached and the interior sound detection unit 3, and synchronizes, based on the transmission function, a phase of the reference signal from the exterior sound detection unit 1 with a phase of the error signal from the interior sound detection unit 3.

In the vehicle S including the above-described sound insulation device, a noise from a noise source such as the sound of the engine ENG illustrated in FIG. 1 and the road noise from the tire TR is detected by the exterior sound detection unit 1 by an operation of the sound insulation device, and a detection result obtained is transmitted to the control unit 5 as the reference signal. In addition, an interior sound is detected by the interior sound detection unit 3, and a detection result obtained is transmitted to the control unit 5 as the error signal.

In the case where the reference signal and the error signal are transmitted to the control unit 5, the transmission function correction unit 31 of the control unit 5 obtains the transmission function in the transmission path of the noise between the exterior sound detection unit 1 and the interior sound detection unit 3. Further, based on the transmission function, the phase of the reference signal from the exterior sound detection unit 1 is synchronized with the phase of the error signal from the interior sound detection unit 3.

Further, the adaptive algorithm 33 and the adaptive filter 35 of the control unit 5 generate the cancel signal for minimizing the error signal, which has a phase opposite to that of the reference signal synchronized with the phase of the error signal. The cancel signal is transmitted to the amplifier 37, amplified by the amplifier 37, and transmitted to the vibration output unit 13.

The vibration output unit 13 generates a vibration corresponding to the transmitted cancel signal to vibrate the glass sheet composite 11 to which the vibration output unit 13 is attached. Therefore, the vibration of the glass sheet composite 11 due to the exterior noise is canceled by the vibration of the vibration output unit 13, and the transmission of the noise from the exterior to the interior is prevented.

Figure 7A:
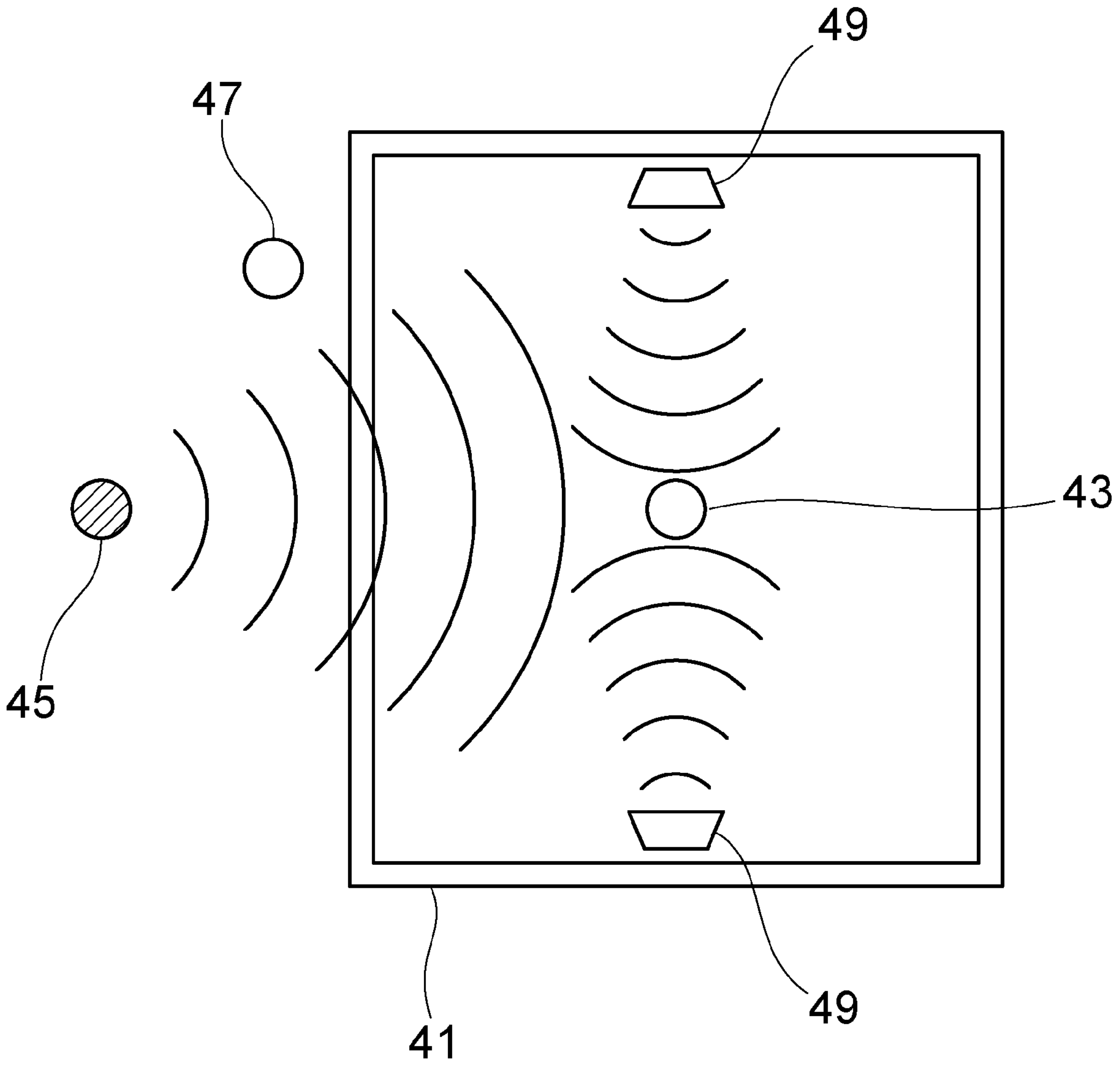
FIG. 7A is a schematic diagram of the noise reduction device.
Figure 7B:
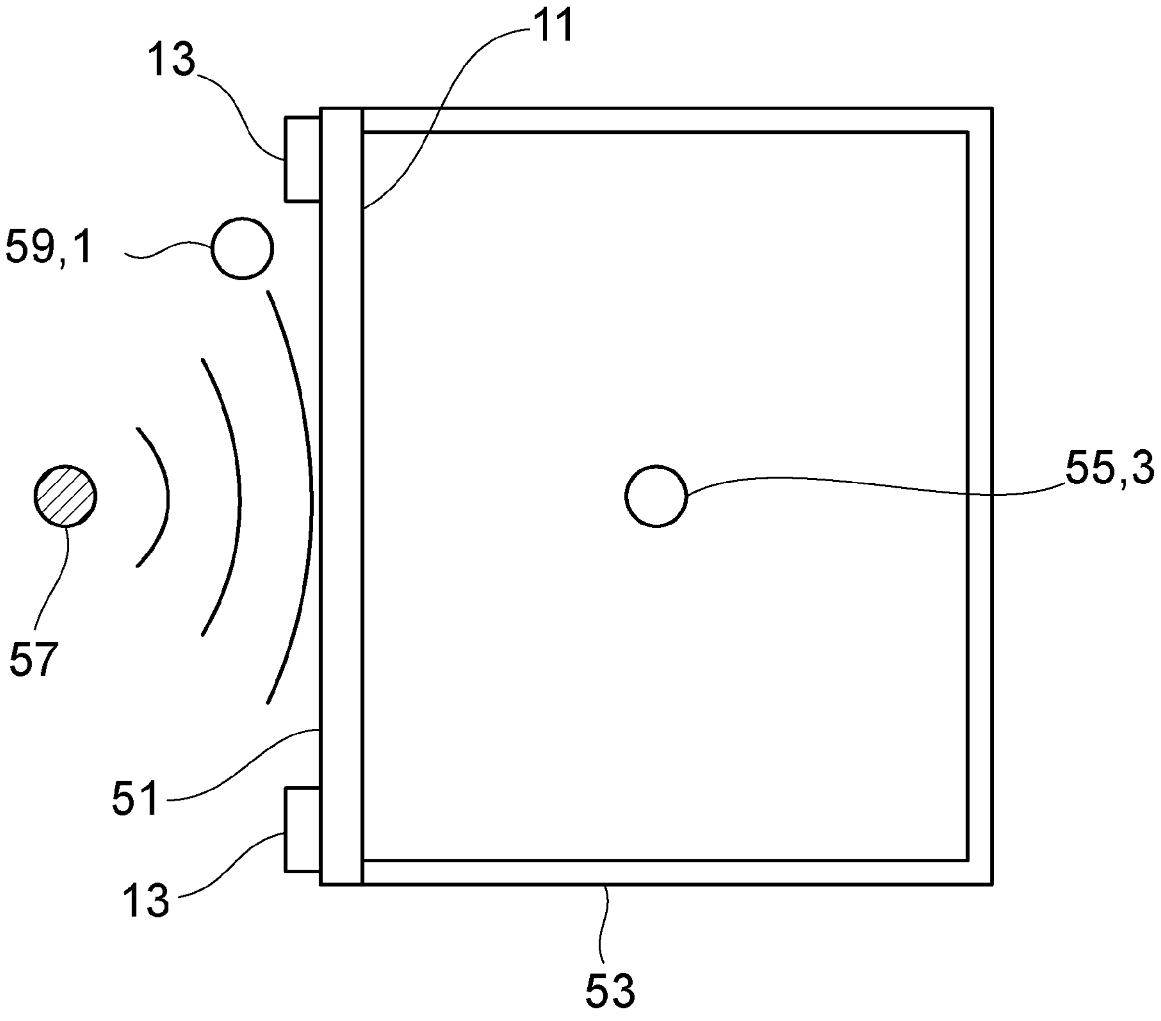
FIG. 7B is a schematic diagram of the sound insulation device.

Each of FIGS. 7A and 7B is a diagram illustrating a difference between a general noise reduction device and the sound insulation device including the glass sheet composite. FIG. 7A is a schematic diagram of the general noise reduction device, and FIG. 7B is a schematic diagram of the sound insulation device including the glass sheet composite.

In the general noise reduction device illustrated in FIG. 7A, a control microphone 43 is provided in an interior surrounded by an outer wall 41, and a detection microphone 47 is provided in an exterior having a noise source 45. Further, speakers 49 for vibrating a vibrating body such as a cone paper is disposed in the interior. In the noise reduction device, a cancel sound for minimizing an error signal is output from the speakers 49 according to a reference signal from the detection microphone 47 that detects an exterior sound and the error signal from the control microphone 43 that detects an interior sound. Accordingly, the sound flowing from the exterior into the interior is reduced.

In the noise reduction device, it is possible to reduce the sound flowing into the interior regardless of the sound transmission path into the interior. In addition, there is an advantage that the existing speakers 49 such as an audio system installed in the interior can be used. However, in the noise reduction device that outputs the cancel sound from the speakers 49 and reduces the noise flowing into the interior, it is difficult to effectively reduce a noise exceeding, for example, 150 Hz in a high-frequency band. In addition, the noise reduction device is likely to be affected by an interior sound environment, and has a lot of problems in order to accurately reduce noise. In addition, even in the case where it is possible to cope with a known noise such as a sound of an engine mounted on a vehicle, it may be difficult to effectively reduce other noises.

On the other hand, in the sound insulation device including the glass sheet composite 11 illustrated in FIG. 7B, a control microphone 55 as the interior sound detection unit 3 is provided in an interior surrounded by an outer wall 53 having a window 51, and a detection microphone 59 as the exterior sound detection unit 1 is provided in an exterior having a noise source 57. Further, the window 51 is closed by the glass sheet composite 11, and the vibration output unit 13 is attached to the glass sheet composite 11. In the sound insulation device, a cancel signal for minimizing an error signal is generated according to a reference signal from the detection microphone 59 that detects an exterior sound and the error signal from the control microphone 55 that detects an interior sound. Then, the cancel signal is output to the vibration output unit 13 to vibrate the glass sheet composite 11. Accordingly, the vibration of the glass sheet composite 11 due to the exterior noise is canceled by the vibration of the vibration output unit 13, and the transmission of the noise from the exterior to the interior is prevented.

As described above, according to the sound insulation device illustrated in FIG. 7B, by vibrating the glass sheet composite 11 by the vibration output unit 13, it is possible to prevent the transmission of the noise from the exterior to the interior. Accordingly, the glass sheet composite 11 can effectively reduce a noise in a high-frequency band, for example, exceeding 150 Hz, which is difficult to be canceled by the cancel sound from the speaker in the case where the noise flows into the interior. In addition, since it is possible to prevent the exterior noise itself from flowing through the window, it is possible to reduce the noise in the interior regardless of the interior sound environment. That is, it is possible to prevent the inflow of a noise in a wide frequency band including the high-frequency band through the window, and to form a good interior environment in which the noise is reduced.

In addition to vibrating the glass sheet composite 11 by the vibration output unit 13, a cancel sound according to the cancel signal may be output from the acoustic speakers 7. In this case, even in the case where the noise flows into the interior, the noise can be canceled, and the noise in the interior can be further reduced.

Next, another embodiment of the sound insulation device will be described.

Figure 8:
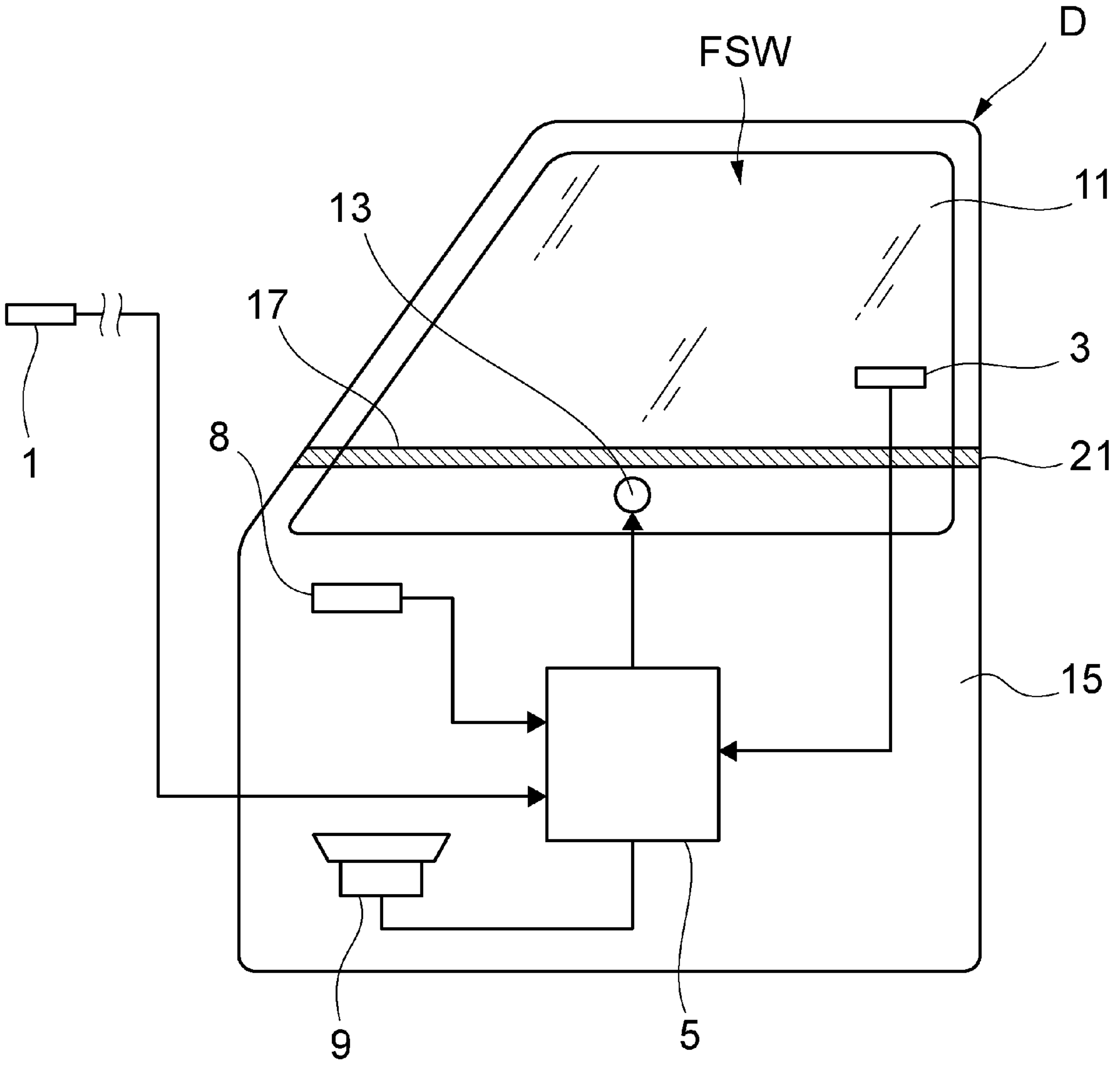
FIG. 8 is a schematic configuration diagram of the door of the vehicle on which a sound insulation device having another configuration is mounted.

FIG. 8 is a schematic configuration diagram of the door D of the vehicle S on which a sound insulation device having another configuration is mounted.

As illustrated in FIG. 8, the sound insulation device includes an internal space sound detection unit 8 formed of a microphone in the internal space 19 of the surrounding member 15 which surrounds the excitation region A1 of the glass sheet composite 11 to which the vibration output unit 13 is attached. An auxiliary speaker 9 is provided in the internal space 19. Each of the internal space sound detection unit 8 and the auxiliary speaker 9 is connected to the control unit 5.

The internal space sound detection unit 8 detects a vibration sound from the excitation region A1 of the glass sheet composite 11 generated by the vibration of the vibration output unit 13, and transmits the vibration sound to the control unit 5 as an error signal. In response to the error signal from the internal space sound detection unit 8, the control unit 5 causes the adaptive algorithm 33 and the adaptive filter 35 to generate a cancel signal for minimizing the error signal from the internal space sound detection unit 8, and outputs the cancel sound to the auxiliary speaker 9. In the case where the cancel sound is output from the auxiliary speaker 9, the vibration sound from the excitation region A1 of the glass sheet composite 11 generated by the vibration of the vibration output unit 13 in the internal space 19 is cancelled.

As described above, according to the sound insulation device according to another embodiment, it is possible to prevent the transmission of the noise from the exterior of the vehicle S to the interior by vibrating the glass sheet composite 11 by the vibration output unit 13, and to cancel a secondary noise generated due to the vibration of the vibration output unit 13. Accordingly, a noise reduction effect in the interior of the vehicle S can be further enhanced.

In order to cancel the sound caused by the vibration of the vibration output unit 13, the auxiliary speaker 9 that outputs the cancel sound is provided in the internal space 19, and an output form of the cancel sound is not limited thereto. For example, a configuration may be adopted in which a cancel sound that cancels the sound generated due to the vibration of the vibration output unit 13 is output from the acoustic speakers 7, or a configuration may be adopted in which the auxiliary speaker 9 and the acoustic speakers 7 are used in combination.

A sound-absorbing material such as felt or sponge may be attached to the inside or outside of the surrounding member 15. In this case, a silencing effect in the internal space 19 is enhanced. Specifically, it is preferable to use a resonance type sound-absorbing material such as a porous sound-absorbing material or a perforated board as the sound-absorbing material, and it is more preferable to use a porous sound-absorbing material from the viewpoint of the frequency band that can absorb the sound. The vertical incidence sound absorption rate at 1 kHz of the sound-absorbing material is preferably 0.25 or more, more preferably 0.5 or more, and still more preferably 0.75 or more. The thickness of the sound-absorbing material is preferably 0.5 mm or more and 20 mm or less, and more preferably 1 mm or more and 10 mm or less. A surface to which the sound-absorbing material is attached is preferably 25% or more of an area surrounding the internal space 19 of the surrounding member 15, and more preferably 50% or more.

Further, in the sound insulation device, a sound-absorbing material may be attached to a part or all of surfaces of the excitation region A1 of the glass sheet composite 11. In this case, generation of a standing wave is prevented, such that a sound pressure level in the internal space 19 can be reduced. As the sound-absorbing material, the resonance type sound-absorbing material such as the porous sound-absorbing material made of sponge, fiber, or the like, and the perforated board can be applied, and it is preferable to use the porous sound-absorbing material from the viewpoint of the frequency band that can absorb the sound and weight reduction of the glass sheet composite 11.

The sound-absorbing material can be attached to at least one surface of the glass sheet composite 11, and preferably, the sound-absorbing material is attached to both surfaces of the glass sheet composite 11. In the case where the sound-absorbing material is attached to a certain surface of the vibration output unit 13, it is preferable to cover the vibration output unit 13 with the sound-absorbing material.

In the case where the sound-absorbing material is attached to the glass sheet composite 11, an attaching area of the sound-absorbing material is preferably 50% or more, and more preferably 75% or more of the area of at least one surface of the excitation region A1. Further, the vertical incidence sound absorption rate at 1 kHz of the excitation region A1 is preferably 0.25 or more, more preferably 0.5 or more, and still more preferably 0.75 or more. The thickness of the sound-absorbing material is preferably 0.5 mm or more and 30 mm or less, and more preferably 5 mm or more and 20 mm or less.

Here, results of measuring the sound pressure level in the internal space 19 of the surrounding member 15 in the sound insulation device in the case where no sound-absorbing material is provided and in the case where the sound-absorbing material is provided at each position will be described.

The sound pressure level in the internal space 19 was measured when a sine wave signal with an output voltage of 1 V was applied to the sound insulation devices of the following cases (a) to (d).

Figure 9A:
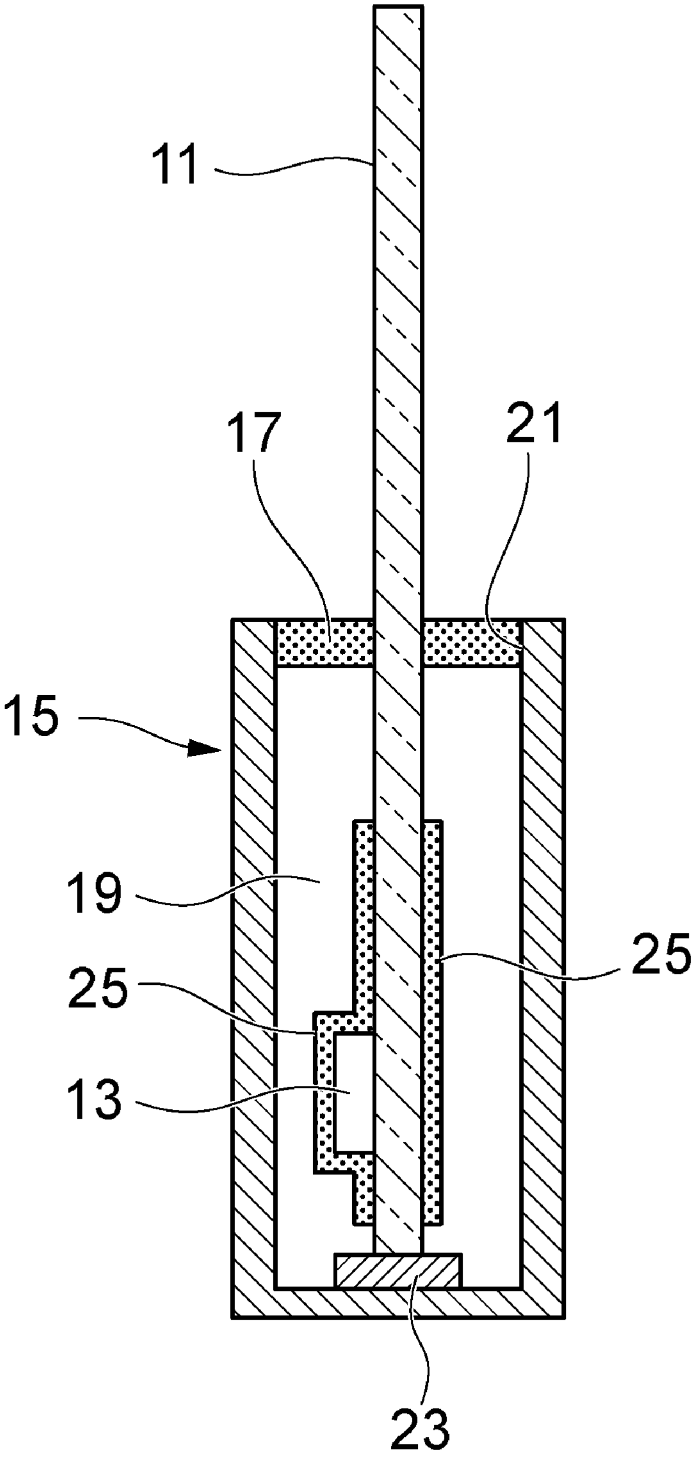
FIG. 9A is a schematic cross-sectional view of the sound insulation device in which the sound-absorbing material is attached to the glass sheet composite.

(a) A sound insulation device without a sound-absorbing material (b) A sound insulation device in which the sound-absorbing material 25 is attached to both surfaces of the glass sheet composite 11 (FIG. 9A)

Figure 9B:
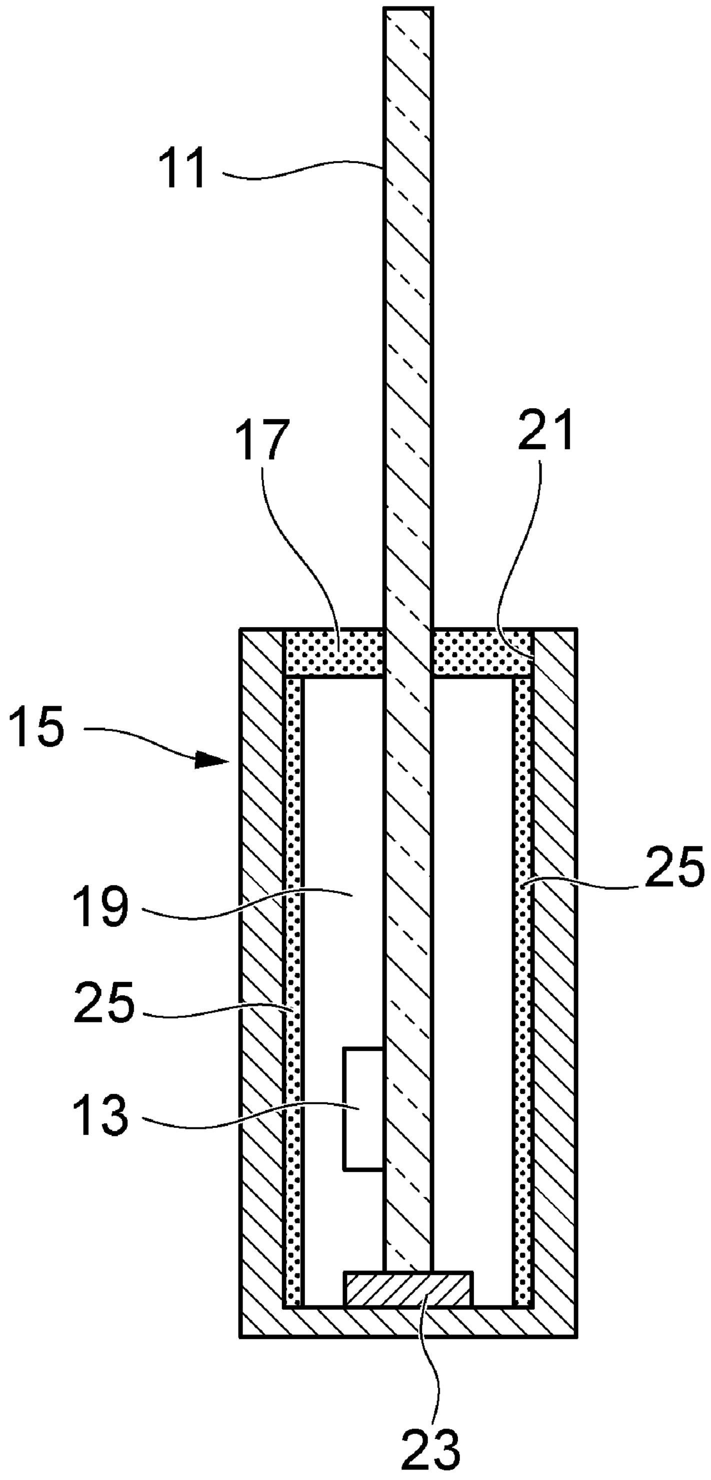
FIG. 9B is a schematic cross-sectional view of the sound insulation device in which the sound-absorbing material is attached to a wall surface of the surrounding member.

(c) A sound insulation device in which the sound-absorbing material 25 is attached to the entire wall surface of the surrounding member 15 (FIG. 9B)

Figure 9C:
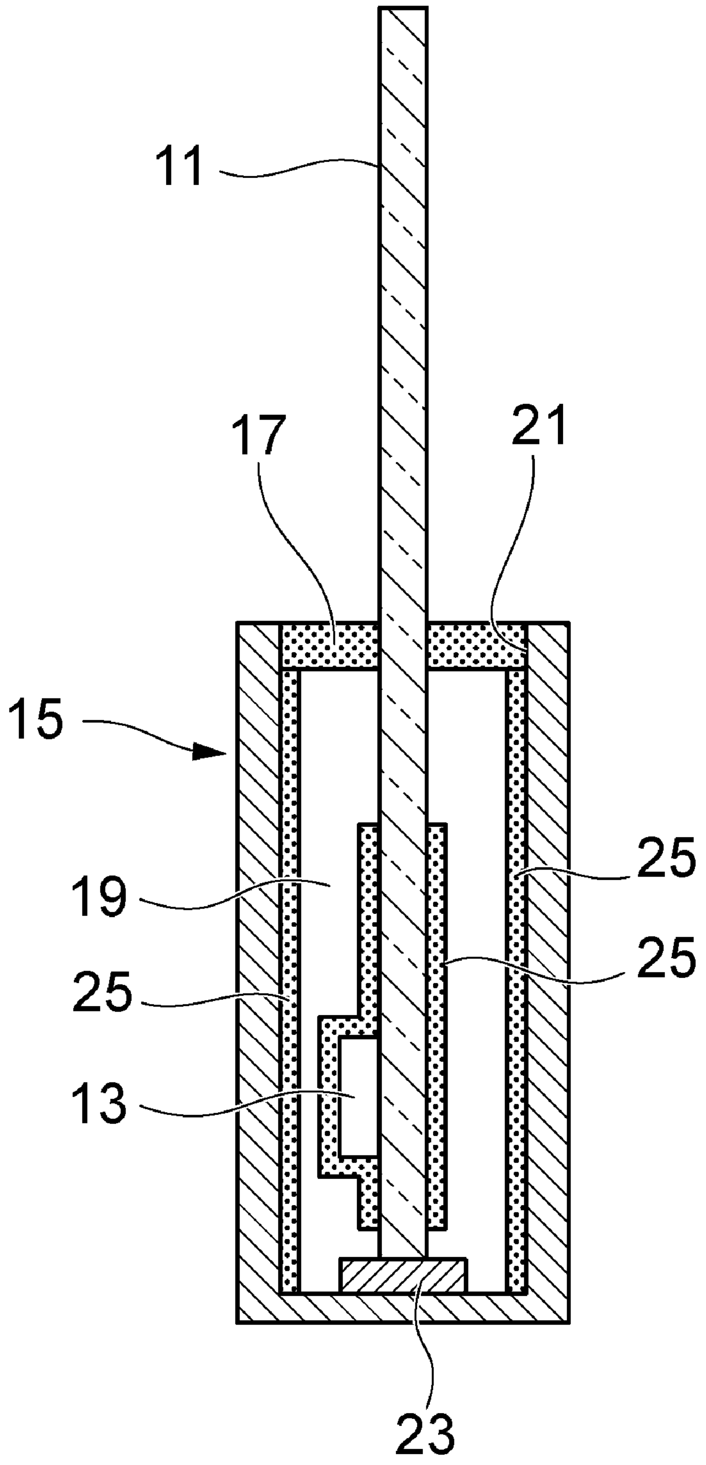
FIG. 9C is a schematic cross-sectional view of the sound insulation device in which the sound-absorbing material is attached to the glass sheet composite and the wall surface of the surrounding member.

(d) A sound insulation device in which the sound-absorbing material 25 is attached to the entire wall surface of the surrounding member 15, and further the sound-absorbing material 25 is attached to both surfaces of the glass sheet composite 11 (FIG. 9C).

As each of the sound insulation devices, the glass sheet composite 11 having a size of 100 mm×100 m×1.0 mm simulating the excitation region A1 was installed in an acrylic container having an inner size of 295 mm×295 mm×120 mm simulating the internal space 19, and the vibration output unit 13 having an impedance of 4Ω was installed at the center of the glass sheet composite 11.

Figure 10:
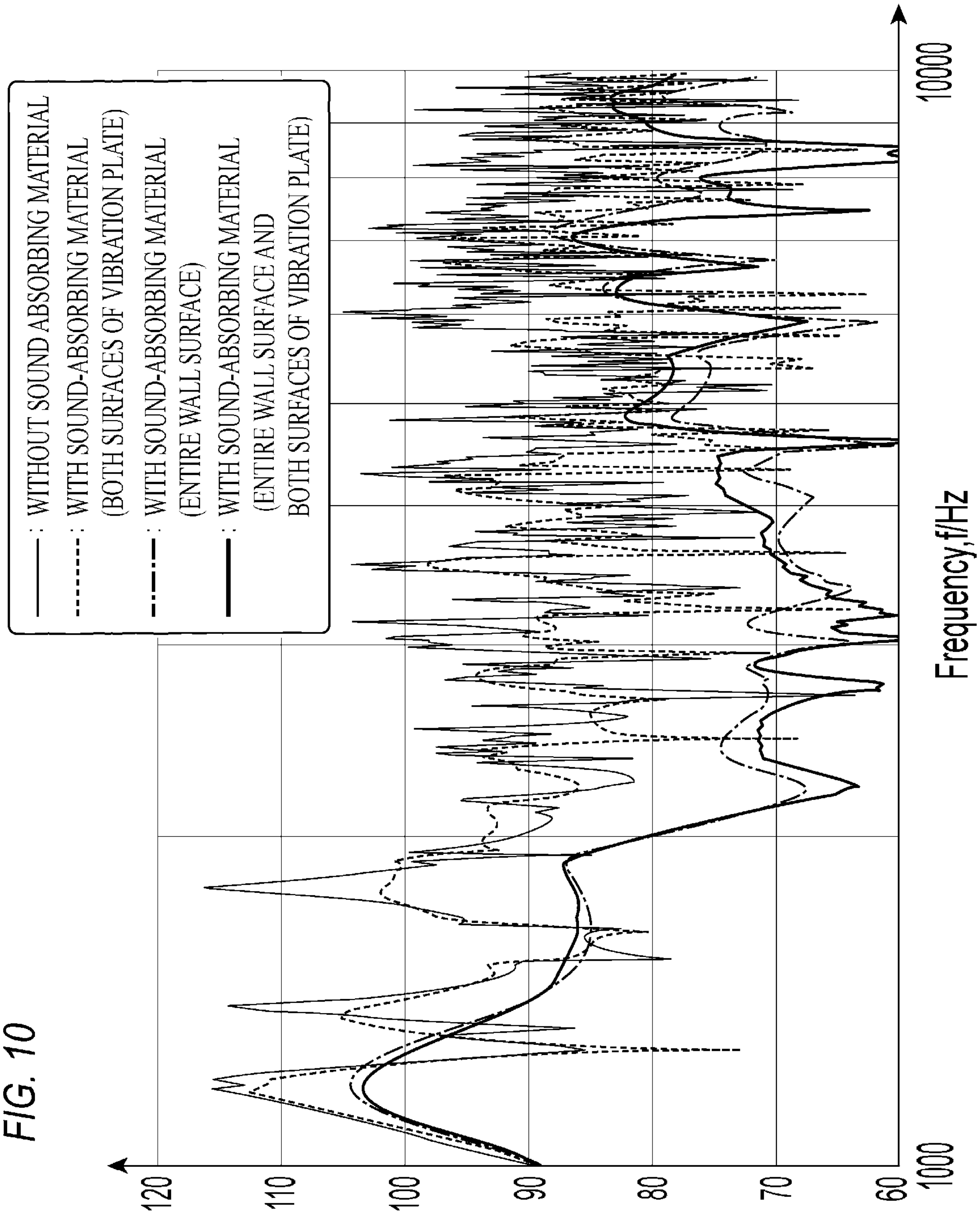
FIG. 10 is a graph showing a frequency distribution of a sound pressure level in the surrounding member in various sound insulation devices.

FIG. 10 is a graph showing a frequency distribution of the sound pressure level in the surrounding member 15 in each of the sound insulation devices.

As illustrated in FIG. 10, in the case where the sound-absorbing material 25 was not attached to the wall surface of the surrounding member 15 and the glass sheet composite 11 (Comparative Example), a standing wave was generated in the internal space 19, and a sharp peak was generated in the sound pressure level (the thin line in FIG. 10).

On the other hand, in the case where the sound-absorbing material 25 is attached to the entire wall surface of the surrounding member 15 (Inventive Example: FIG. 9B), or in the case where the sound-absorbing material 25 is attached to the entire wall surface of the surrounding member 15 and both surfaces of the glass sheet composite 11 (Inventive Example: FIG. 9C), frequency characteristics become flat and an average sound pressure level is reduced (the dash-dotted line and the thick line in FIG. 10).

On the other hand, in the case where the sound-absorbing material 25 was attached to both surfaces of the glass sheet composite 11 and the sound-absorbing material 25 was not attached to the wall surface of the surrounding member 15 (Inventive Example: FIG. 9A), the average sound pressure level was equivalent to the state in which the sound-absorbing material 25 was not attached. However, a peak of the sound pressure level can be eliminated by an effect of preventing the generation of the standing wave, and a noise sound generated in the internal space 19 can be effectively reduced (the dotted line in FIG. 10).

Therefore, from the viewpoint of sound performance, it is preferable to attach the sound-absorbing material 25 to the entire inner surface of the internal space 19 of the surrounding member 15, and it is more preferable to attach the sound-absorbing material 25 to the entire inner surface of the internal space 19 of the surrounding member 15 and both surfaces of the excitation region A1. However, based on a balance between material cost and construction cost and an expected acoustic effect, it is more preferable to attach the sound-absorbing material 25 only to at least one surface of the excitation region A1, and it is particularly preferable to attach the sound-absorbing material 25 only to both surfaces of the excitation region A1.

In the above-described sound insulation device, in the case where the glass sheet composite 11 is formed by using a plurality of glass plates, the excitation region to which the vibration output unit 13 is attached may be formed by a single glass plate.

Figure 11:
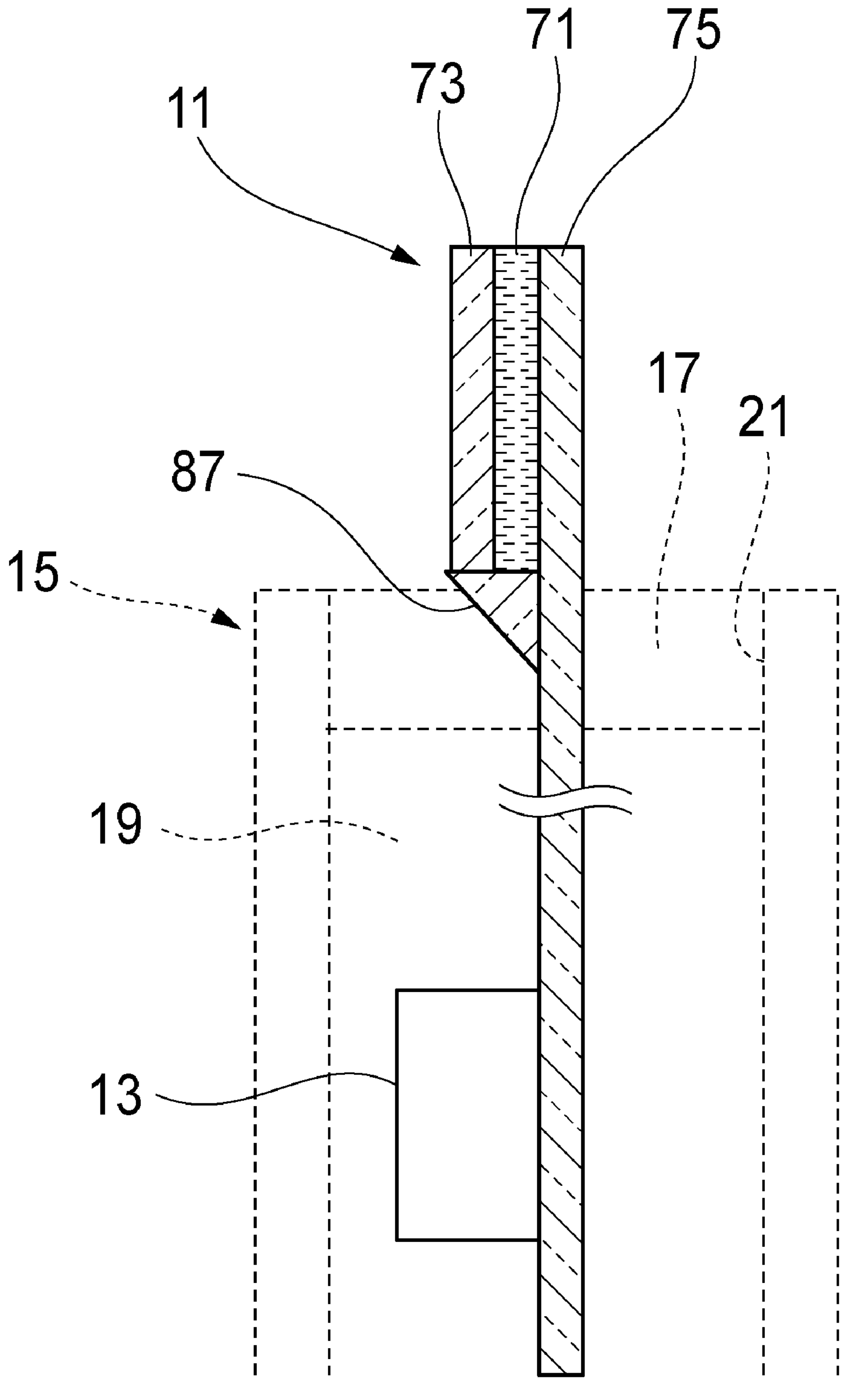
FIG. 11 is a partial cross-sectional view illustrating a state in which the vibration output unit is attached to the glass sheet composite in which an excitation region is made of a single glass plate.

FIG. 11 is a partial cross-sectional view illustrating a state in which the vibration output unit 13 is attached to the glass sheet composite 11 in which the excitation region is made of a single glass plate.

Of the pair of glass plates 73 and 75 of the glass sheet composite 11, an outer edge of the glass plate 75 extends outside the glass plate 73. The vibration output unit 13 is attached to a portion extending outside the glass plate 73. A sealing material 87 is provided at end portions of the glass plate 73 and the intermediate layer 71 to seal the intermediate layer 71.

According to the configuration, since the vibration output unit 13 vibrates the single glass plate 75, energy efficiency can be enhanced and the glass sheet composite 11 can be vibrated, as compared with the case where the plurality of glass plates 73 and 75 are vibrated simultaneously.

Figure 12:
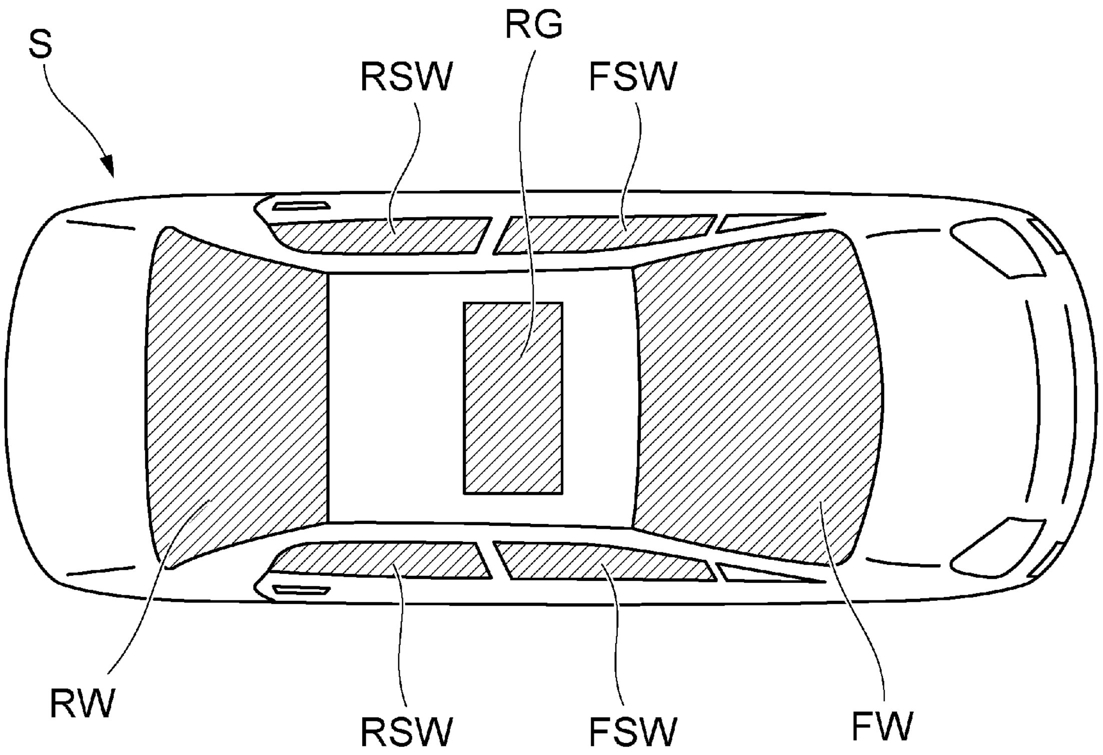
FIG. 12 is a plan view of a vehicle illustrating another application location of the sound insulation device in the vehicle.

A window formed by the glass sheet composite 11 of the sound insulation device is not limited to the front side window FSW in the vehicle S. For example, as illustrated in FIG. 12, the glass sheet composite 11 of the sound insulation device may be provided in a rear side window RSW, a front window FW, a rear window RW, a roof glazing RG, or the like of the vehicle S.

In addition, the sound insulation device can also be applied to other than the vehicle S. For example, the sound insulation device can also be applied to windows of an aircraft, a ship, and the like, and windows of a building such as a house.

Figure 13:
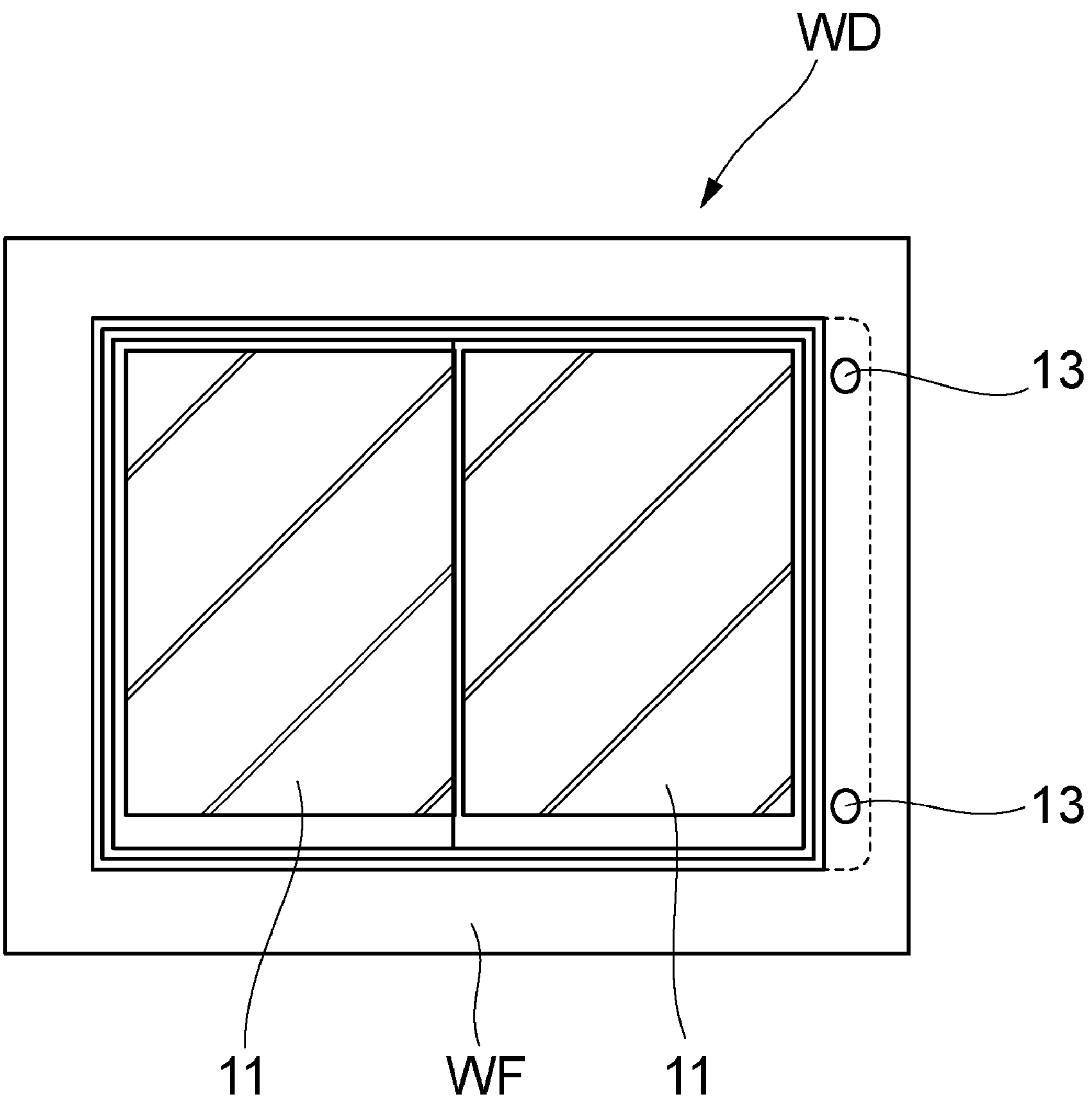
FIG. 13 is a front view of a window of a house to which the sound insulation device is applied.

FIG. 13 illustrates an example applied to a window WD of a house. In this case, the glass sheet composites 11 are provided in the window WD in a room in the house, and the vibration output units 13 are attached to portions of the glass sheet composite 11 disposed in a window frame WF. In this way, by applying the sound insulation device to the window WD in the house, it is possible to prevent the transmission of a sound from the exterior to the interior by vibrating the glass sheet composites 11 by the vibration output units 13.

In addition to the window of a moving body and the building, the sound insulation device described above can be used to, for example, a full range speaker, a bass reproduction speaker in a band of 15 Hz to 200 Hz, a high-pitched reproduction speaker in a band of 10 kHz to 100 kHz, a large speaker of which an area of a vibration plate is 0.2 $m^2$ or more, a planar speaker, a cylindrical speaker, a transparent speaker, a cover glass for a mobile device which functions as a speaker, a cover glass for a TV display, a screen film, a display in which a video signal and an audio signal are generated from the same surface, a speaker for a wearable display, an electric display, and a lighting fixture, as an electronic device member. These speakers may be for music or an alarm sound. In addition, by adding a vibration detection element such as an acceleration sensor, the sound insulation device can be used as a vibration plate for a microphone or a vibration sensor.

The sound insulation device can be used as an interior vibration member of transportation machinery such as a vehicle, and as an in-vehicle-mounted speaker. For example, the sound insulation device can be used for a side mirror functioning as a speaker, a sun visor, an instrument panel, a dashboard, a ceiling, a door, and various other interior panels. Further, these members also function as microphones and vibration plates for active noise control.

The sound insulation device can be used, for example, as an opening member used in construction and transportation machinery. In this case, functions such as IR cut, UV cut, and coloring can be imparted to the glass sheet composite.

More specifically, the sound insulation device can be applied to the front window FW, the front side window FSW, the rear side window RSW, the rear window RW, or the roof glazing RG of the vehicle S having a vehicle interior speaker, a vehicle exterior speaker, and a sound insulation function. The FW, the FSW, the RSW, the RW, or the RG may function as an acoustic reflection (reverberation) plate. Further, the glass sheet composite can also be used as a window for a vehicle, a structural member, or a decorative panel in which water repellency, snow adhesion resistance, ice adhesion resistance, and antifouling properties are improved by a sound wave vibration. Specifically, the glass sheet composite can be used as a lens, a sensor, and a cover glass thereof in addition to an automotive window glass, a mirror, and a plate-shaped member having a flat plate shape or a curved surface shape which is mounted in a vehicle.

As a construction member, a window glass, a door glass, a roof glass, an interior material, an exterior material, a decorative material, a structural material, an outer wall, and a cover glass for a solar cell, which function as a vibration plate or a vibration detection device, can be used. Furthermore, the glass sheet composite can be used as a partition, a dresser, or the like in a bank, a hospital, a hotel, a restaurant, an office, or the like. These components may function as an acoustic reflection (reverberation) plate. Water repellency, snow adhesion resistance, and antifouling properties can be improved by a sound wave vibration.

For the configuration of the internal space 19 of the sound insulation device, the above-described surrounding member or the glass sheet composite itself can be used, and for example, a body of an automobile, a door panel, and a sash member in the case of a construction member can be used.

In addition, a vibrator serving as the vibration output unit 13 can prevent a vibration of a vibrator housing and increase an excitation force by fixing a rear side of the vibrator to a back plate, a frame, or the like.

Further, by depressurizing the inside of the internal space 19 or by filling He gas, a propagation speed of a sound wave can be reduced, and a sound insulation property can be improved. In addition, a sound-insulating material and a sound-absorbing material are disposed in the internal space 19, and transmission of a sound from the surrounding member 15 and resonance in the internal space 19 can be prevented.

<Specific Configuration Example of Glass Sheet Composite>

Although details will be described later, the glass sheet composite constituting the sound insulation device described above preferably has a loss coefficient at 25° C. of $1\times10^{-3}$ or more and a longitudinal wave sound velocity value in a plate thickness direction of $4.0\times10^{3}$ m/s or more. A large loss coefficient means a large vibration damping capacity.

As for the loss coefficient, a value calculated by a half-width method is used. Denoting f as a resonance frequency of a material and W as a frequency width at a point decreased by −3 dB from a peak value of an amplitude h, that is, a point at a maximum amplitude of −3 [dB], a value represented by {W/f} is defined as the loss coefficient.

In order to prevent the resonance, the loss coefficient may be increased, which means that the frequency width W becomes relatively large with respect to the amplitude h and the peak becomes broader.

The loss coefficient is a unique value of a material or the like, for example, in the case of a single glass plate, the loss coefficient is different depending on a composition, a relative density, and the like. The loss coefficient can be measured by a dynamic elastic modulus testing method such as a resonance method.

The longitudinal wave sound velocity value refers to a velocity at which a longitudinal wave propagates in the vibration plate. The longitudinal wave sound velocity value and the Young's modulus can be measured by an ultrasonic pulse method described in Japanese Industrial Standards (JIS-R1602-1995).

Here, as a specific configuration for obtaining a high loss coefficient and a high longitudinal wave sound velocity value, the glass sheet composite preferably includes two or more glass plates, and preferably includes a predetermined intermediate layer between at least a pair of glass plates among the glass plates.

Here, the glass plate means an inorganic glass and an organic glass. Examples of the organic glass include a PMMA resin, a PC resin, a PS resin, a PET resin, and a cellulose resin, which are generally well known as a transparent resin.

In the case where two or more glass plates are used, one of the glass plates may be the inorganic glass or the organic glass, and in place of the other glass plate, various plates such as a resin plate made of a resin other than the organic glass, a metal plate such as aluminum, and a ceramic plate made of ceramic may be used. From the viewpoints of design attractiveness, processability, and a weight, it is preferable to use the organic glass, a resin material, a composite material or a fiber material, a metal material, or the like, and from the viewpoint of vibration characteristics, it is preferable to use the inorganic glass, a highly rigid composite material or a fiber material, a metal material, or a ceramic material.

As the resin material, it is preferable to use a resin material that can be molded into a flat plate shape or a curved plate shape. As the composite material or the fiber material, it is preferable to use a resin material or a carbon fiber which is compounded with a high-hardness filler, a Kevlar fiber, or the like. As the metal material, aluminum, magnesium, copper, silver, gold, iron, titanium, SUS, and the like are preferable, and other alloy materials and the like may be used as necessary.

As the ceramic material, for example, ceramics such as $Al_2O_3$, SiC, $Si_3N_4$, AlN, mullite, zirconia, yttria, and YAG, and a single crystal material are more preferable. More preferably, the ceramic material is a material having a light-transmitting property.

<Specific Configuration Example of Intermediate Layer>

As the intermediate layer between the plurality of glass plates laminated on each other, a fluid layer or a gel body formed of a fluid such as a liquid or a liquid crystal is preferable. The intermediate layer may be polyvinyl butyral (PVB), an ethylene-vinyl acetate copolymer resin (EVA), polyurethane, or the like, which is suitably used as an intermediate film of a laminated glass.

(Fluid Layer)

The glass sheet composite can achieve a high loss coefficient by providing a fluid layer containing a liquid between at least a pair of glass plates. In particular, the loss coefficient can be further increased by setting a viscosity and a surface tension of the fluid layer within a suitable range. This is considered to because, unlike the case where a pair of glass plates are provided with an adhesive layer interposed therebetween, the pair of glass plates do not adhere to each other, and vibration characteristics of each glass plate continue to be maintained. The term "fluid" as used in the specification means all materials having fluidity including liquids such as liquids, semi-solids, mixtures of solid powders and liquids, and solid gels (jelly substances) impregnated with liquids.

The fluid layer preferably has a viscosity coefficient at 25° C. of $1\times10^{-4}$ Pa·s to $1\times10^{3}$ Pa·s and a surface tension at 25° C. of 15 mN/m to 80 mN/m. In the case where the viscosity is too low, vibration is less likely to be transmitted, and in the case where the viscosity is too high, the pair of glass plates positioned on both sides of the fluid layer adhere to each other to exhibit a vibration behavior as a single glass plate, such that resonance vibration is less likely to be attenuated. In addition, in the case where the surface tension is too low, the adhesion between the glass plates is reduced, and the vibration is less likely to be transmitted. In the case where the surface tension is too high, the pair of glass plates positioned on both sides of the fluid layer are likely to adhere to each other to exhibit the vibration behavior as a single glass plate, such that the resonance vibration is less likely to be attenuated.

The viscosity coefficient of the fluid layer at 25° C. is more preferably $1\times10^{-3}$ Pa·s or more, and still more preferably $1\times10^{-2}$ Pa·s or more. Further, the viscosity coefficient is more preferably $1\times10^{2}$ Pa·s or less, and still more preferably 1×10 Pa·s or less. The surface tension of the fluid layer at 25° C. is more preferably 20 mN/m or more, and still more preferably 30 mN/m or more.

The viscosity coefficient of the fluid layer can be measured by a rotational viscometer or the like. The surface tension of the fluid layer can be measured by a ring method or the like.

In the case where a vapor pressure of the fluid layer is too high, the fluid layer may evaporate and fail to function as the glass sheet composite. Therefore, the vapor pressure of the fluid layer at 25° C. and 1 atm is preferably $1\times10^{4}$ Pa or less, more preferably $5\times10^{3}$ Pa or less, and still more preferably $1\times10^{3}$ Pa or less. In addition, in the case where the vapor pressure is high, sealing or the like may be performed such that the fluid layer does not evaporate, whereas at this time, it is necessary to prevent the vibration of the glass sheet composite from being disturbed by a sealing material.

The thinner the thickness of the fluid layer is, the more preferable it is from the viewpoint of maintaining high rigidity and transmitting vibration. Specifically, in the case where the total thickness of the pair of glass plates is 1 mm or less, the thickness of the fluid layer is preferably 1/10 or less, more preferably 1/20 or less, still more preferably 1/30 or less, even more preferably 1/50 or less, still even more preferably 1/70 or less, and particularly preferably 1/100 or less, of the total thickness of the pair of glass plates. In the case where the total thickness of the pair of glass plates is more than 1 mm, the thickness of the fluid layer is preferably 100 μm or less, more preferably 50 μm or less, still more preferably 30 μm or less, even more preferably 20 μm or less, still even more preferably 15 μm or less, and particularly preferably 10 μm or less. A lower limit of the thickness of the fluid layer is preferably 0.01 μm or more from the viewpoint of film formability and durability.

It is preferable that the fluid layer be chemically stable, and the fluid layer and the pair of glass plates positioned on both sides of the fluid layer do not react with each other. The "chemically stable" means, for example, to undergo little degradation (deterioration) by light irradiation or not to cause solidification, vaporization, decomposition, discoloration, chemical reaction with a glass, or the like at least in a temperature region of −20° C. to 70° C.

Specific examples of a component of the fluid layer include water, oil, an organic solvent, a liquid polymer, an ionic liquid, and a mixture thereof. More specifically, examples thereof include propylene glycol, dipropylene glycol, tripropylene glycol, a straight silicone oil (a dimethyl silicone oil, a methylphenyl silicone oil, a methyl hydrogen silicone oil), a modified silicone oil, an acrylic acid-based polymer, liquid polybutadiene, a glycerin paste, a fluorine-based solvent, a fluorine-based resin, acetone, ethanol, xylene, toluene, water, mineral oil, and a mixture thereof. In particular, it is preferable that at least one selected from the group consisting of propylene glycol, a dimethyl silicone oil, a methylphenyl silicone oil, a methyl hydrogen silicone oil, and a modified silicone oil be included, and it is more preferable that propylene glycol or a silicone oil be a main component.

In addition to the above, a slurry in which a powder is dispersed can also be used as the fluid layer. From the viewpoint of improving the loss coefficient, although the fluid layer is preferably a uniform fluid, the slurry is effective in the case of imparting designability and functionality such as coloring and fluorescence to the glass sheet composite. A content of the powder in the fluid layer is preferably 0 volume % to 10 volume %, and more preferably 0 volume % to 5 volume %. From the viewpoint of preventing sedimentation, a particle diameter of the powder is preferably 10 nm to 1 μm, and more preferably 0.5 μm or less.

In addition, from the viewpoint of imparting designability and functionality, the fluid layer may contain a fluorescent material. In this case, the fluid layer may be a slurry fluid layer in which a fluorescent material is dispersed as a powder, or a uniform fluid layer in which a fluorescent material is mixed as a liquid. Accordingly, an optical function such as light absorption and light emission can be imparted to the glass sheet composite.

In the case where a film-shaped substance is used for the intermediate layer, a preferred material is a substance that satisfies any one of properties (1) to (3) below.

(1) The thickness of the intermediate layer is 1 mm or less, (2) the compression storage elastic modulus at a temperature of 25° C. is $1.0\times10^4$ Pa or less, and (3) at a temperature of 25° C. and 1 Hz, the compression storage elastic modulus is higher than the compression loss modulus.

In the configuration, by satisfying the properties (1), (2), and (3), a loss coefficient is improved while fluidity of the intermediate layer is reduced. In general, in the case where the loss coefficient of the glass sheet composite is improved by increasing the thickness of the intermediate layer, there is a trade-off relationship in which a sound velocity value of the glass sheet composite decreases as the thickness of the intermediate layer increases. On the other hand, in the configuration, in the case where the material of the intermediate layer satisfies the property (2) and the intermediate layer is thin, a high sound velocity value can be secured in addition to a higher loss coefficient in the glass sheet composite.

Regarding the property (1), from the viewpoint of obtaining a high loss coefficient of the glass sheet composite, the thickness of the intermediate layer is 1 mm or less, preferably 100 μm or less, more preferably 10 μm or less, and particularly preferably 5 μm or less. From the viewpoint of a surface roughness of the plate, the thickness is preferably 1 μm or more.

Regarding the property (2), the material of the intermediate layer has the compression storage elastic modulus at the temperature of 25° C. of $1.0\times10^4$ Pa or less, preferably $7.0\times10^3$ Pa or less, and more preferably $5.0\times10^3$ Pa or less. In the case where the material satisfies the property (2), a higher loss coefficient is obtained in the glass sheet composite as the film thickness of the intermediate layer is thinner. From the viewpoint of the fluidity, the compression storage elastic modulus is preferably $1.0\times10^2$ Pa or more.

Since the fluidity of the intermediate layer is reduced by satisfying the property (3), any cutting processing of the glass sheet composite is facilitated. A gel material can also be used for the intermediate layer material.

Examples of the substance constituting the intermediate layer include a carbon-based, fluorine-based, or silicone-based polymeric material on the premise that any one of the above properties (1) to (3) is satisfied. Specific examples thereof include ABS, AES, AS, CA, CN, CPE, EEA, EVA, EVOH, IO, PMMA, PMP, PP, PS, PVB, PVC, RB, TPA, TPE, TPEE, TPF, TPO, TPS, TPU, TPVC, AAS, ACS, PET, PPE, PA6, PA66, PBN, PBT, PC, POM, PPO, ETFE, FEP, LCP, PEEK, PEI, PES, PFA, PPS, PSV, PTFE, PVDF, silicone, polyurethane, PI, and PF. Alternatively, examples thereof include a composite material obtained by combining the above materials. These materials may be used alone or in combination of two or more thereof.

A proportion of the substance satisfying the specific properties in the intermediate layer is preferably 10 mass % to 100 mass %, more preferably 30 mass % to 100 mass %, still more preferably 50 mass % to 100 mass %, and even more preferably 70 mass % to 100 mass %.

Figure 14:
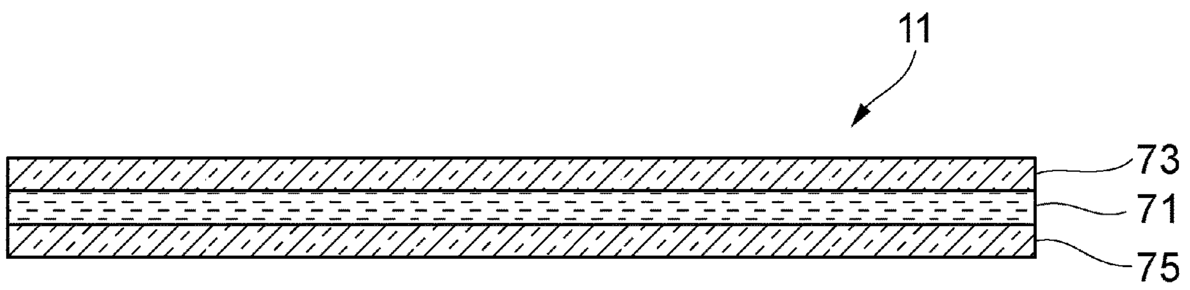
FIG. 14 is a cross-sectional view illustrating a specific example of the glass sheet composite.

FIG. 14 is a cross-sectional view illustrating a specific example of the glass sheet composite.

The glass sheet composite 11 is preferably provided with at least the pair of glass plates 73 and 75 to sandwich the above-described intermediate layer 71 from both sides. In the case where the glass plate 73 resonates, the intermediate layer 71 prevents the glass plate 75 from resonating or attenuates vibration caused by the resonance of the glass plate 75. With the presence of the intermediate layer 71, the glass sheet composite 11 can increase the loss coefficient as compared with the case where the glass plate alone is used.

In the glass sheet composite 11, the larger the loss coefficient is, the more preferable it is, since the vibration damping becomes larger. The loss coefficient of the glass sheet composite 11 at 25° C. is preferably $1\times10^{-3}$ or more, more preferably $2\times10^{-3}$ or more, and still more preferably $5\times10^{-3}$ or more. In addition, the longitudinal wave sound velocity value in the plate thickness direction of the glass sheet composite 11 is preferably $4.0\times10^3$ m/s or more, more preferably $4.5\times10^3$ m/s or more, and still more preferably $5.0\times10^3$ m/s or more, since the higher the sound velocity is, the more the reproducibility of a high-frequency sound is improved when the vibration plate is formed. An upper limit is not particularly limited, and is preferably $7.0\times10^3$ m/s or less.

In the case where a linear transmittance of the glass sheet composite 11 is high, the glass sheet composite 11 can be applied as a light-transmissive member. Therefore, the visible light transmittance determined according to Japanese Industrial Standards (JIS-R3106-1998) is preferably 60% or more, more preferably 65% or more, and still more preferably 70% or more. The light-transmissive member can be applied to, for example, a transparent speaker, a transparent microphone, a building, and an opening member for a vehicle.

It is also useful to match a refractive index for the purpose of increasing the transmittance of the glass sheet composite 11. That is, it is preferable that a refractive index of the glass plate constituting the glass sheet composite 11 and a refractive index of the intermediate layer be closer to each other since reflection and interference at a boundary therebetween are prevented. In particular, a difference between the refractive index of the intermediate layer and the refractive index of the pair of glass plates in contact with the intermediate layer is preferably 0.2 or less, more preferably 0.1 or less, and still more preferably 0.01 or less.

(Glass Plate)

It is also possible to color at least one of at least one plate of the glass plates constituting the glass sheet composite 11 and the intermediate layer. This is useful in the case where the glass sheet composite 11 is desired to have designability, or in the case where the glass sheet composite 11 is desired to have a functional property such as IR cut, UV cut, and privacy glass.

Among the pair of glass plates 73 and 75, one glass plate 73 and the other glass plate 75 preferably have different peak top values of resonance frequencies, and it is more preferable that ranges of the resonance frequencies do not overlap. However, even in the case where the ranges of the resonance frequencies of the glass plate 73 and the glass plate 75 overlap or the peak top values are the same, the vibration of the glass plate 75 does not synchronize due to the presence of the intermediate layer 71 even in the case where the glass plates 73 resonates. Accordingly, the resonance is offset to some extent, and a higher loss coefficient can be obtained as compared with the case where the glass plate alone is used.

That is, when denoting Qa as a resonance frequency (peak top) of the glass plate 73, wa as a half-width of a resonance amplitude thereof, Qb as a resonance frequency (peak top) of the glass plate 75, and wb as a half-width of a resonance amplitude thereof, it is preferable that a relationship represented by the following Formula 1 be satisfied.

$$(wa+wb)/4<|Qa-Qb| \quad \text{Formula 1:}$$

As a value on the left side in Formula 1 is larger, a difference in the resonance frequency (|Qa−Qb|) between the glass plate 73 and the glass plate 75 is larger, which is preferable since a high loss coefficient can be obtained.

Therefore, it is more preferable that the following Formula 2 be satisfied, and it is still more preferable that the following Formula 3 be satisfied.

$$(wa+wb)/2<|Qa-Qb| \quad \text{Formula 2:}$$

$$(wa+wb)/1<|Qa-Qb| \quad \text{Formula 3:}$$

The resonance frequency (peak top) and the half-width of the resonance amplitude of the glass plate can be measured by a method same as that for the loss coefficient in the glass sheet composite.

It is preferable that a mass difference between the glass plate 73 and the glass plate 75 be as small as possible, and it is more preferable that there be no mass difference. In the case where there is a mass difference between the glass plates, the resonance of the lighter glass plate can be reduced by the heavier glass plate, whereas it is difficult to reduce the resonance of the heavier glass plate by the lighter glass plate. That is, in the case where a mass ratio is imbalanced, resonance vibrations cannot theoretically be mutually eliminated because of a difference in an inertial force.

A mass ratio of the glass plate 73 and the glass plate 75 represented by (the glass plate 73/the glass plate 75) is preferably 0.8 to 1.25 (8/10 to 10/8), more preferably 0.9 to 1.1 (9/10 to 10/9), and still more preferably 1.0 (10/10, the mass difference is 0).

The thinner the thicknesses of the glass plates 73 and 75 are, the easier it is for the glass plates to adhere to each other via the intermediate layer, and the less energy the glass plates can vibrate. Therefore, in the case of applications for vibration plates such as a speaker, the thinner the glass plate is, the better the glass plate is. Specifically, the plate thickness of each of the glass plates 73 and 75 is preferably 15 mm or less, more preferably 10 mm or less, still more preferably 5 mm or less, even more preferably 3 mm or less, and particularly preferably 1.5 mm or less. On the other hand, in the case where the thickness is too thin, effects of surface defects on the glass plate tend to be remarkable, cracks tend to occur, and performing a strengthening treatment becomes difficult, and therefore, the thickness is preferably 0.1 mm or more, and more preferably 0.5 mm or more.

In addition, in applications for opening members for construction and vehicles, the plate thickness of each of the glass plates 73 and 75 is preferably 0.5 mm to 15 mm, more preferably 0.8 mm to 10 mm, and still more preferably 1.0 mm to 8 mm.

At least one of the glass plate 73 and the glass plate 75 having a larger loss coefficient is preferable for use as the vibration plate since the vibration damping of the glass sheet composite 11 is also increased. Specifically, the loss coefficient of the glass plate at 25° C. is preferably $1\times10^{-4}$ or more, more preferably $3\times10^{-4}$ or more, and still more preferably $5\times10^{-4}$ or more. An upper limit is not particularly limited, and is preferably $5\times10^{-3}$ or less from the viewpoint of productivity and manufacturing cost. It is more preferable that both the glass plate 73 and the glass plate 75 have the above-described loss coefficient.

The loss coefficient of the glass plate can be measured by a method same as the loss coefficient of the glass sheet composite 11.

At least one of the glass plate 73 and the glass plate 75 has a higher longitudinal wave sound velocity value in the plate thickness direction, which improves reproducibility of a sound in a high-frequency range, and is therefore preferable for use as the vibration plate. Specifically, the longitudinal wave sound velocity value of the glass plate is preferably $4.0\times10^3$ m/s or more, more preferably $5.0\times10^3$ m/s or more, and still more preferably $6.0\times10^3$ m/s or more. An upper limit is not particularly limited, and is preferably $7.0\times10^3$ m/s or less from the viewpoint of the productivity of the glass plate and raw material cost. It is more preferable that both the glass plate 73 and the glass plate 75 satisfy the above-described sound velocity value. The sound velocity value of the glass plate can be measured by a method same as the longitudinal wave sound velocity value of the glass sheet composite.

Compositions of the glass plate 73 and the glass plate 75 are not particularly limited, and are preferably, for example, within the following range. $SiO_2$: 40 mass % to 80 mass %, $Al_2O_3$: 0 mass % to 35 mass %, $B_2O_3$: 0 mass % to 15 mass %, MgO: 0 mass % to 20 mass %, CaO: 0 mass % to 20 mass %, SrO: 0 mass % to 20 mass %, BaO: 0 mass % to 20 mass %, $Li_2O$: 0 mass % to 20 mass %, $Na_2O$: 0 mass % to 25 mass %, $K_2O$: 0 mass % to 20 mass %, $TiO_2$: 0 mass % to 10 mass %, and $ZrO_2$: 0 mass % to 10 mass %. The above compositions account for 95 mass % or more of the entire glass.

Compositions of the glass plate 73 and the glass plate 75, which are displayed by mol % in terms of oxides, are more preferably within the following range.

$SiO_2$: 55 mass % to 75 mass %, $Al_2O_3$: 0 mass % to 25 mass %, $B_2O_3$: 0 mass % to 12 mass %, MgO: 0 mass % to 20 mass %, CaO: 0 mass % to 20 mass %, SrO: 0 mass % to 20 mass %, BaO: 0 mass % to 20 mass %, $Li_2O$: 0 mass % to 20 mass %, $Na_2O$: 0 mass % to 25 mass %, $K_2O$: 0 mass % to 15 mass %, $TiO_2$: 0 mass % to 5 mass %, and $ZrO_2$: 0 mass % to 5 mass %. The above compositions account for 95 mass % or more of the entire glass.

As a specific gravity of each of the glass plates 73 and 75 is smaller, the glass plate can be vibrated with less energy. Specifically, the specific gravity of each of the glass plates 73 and 75 is preferably 2.8 or less, more preferably 2.6 or less, and still more preferably 2.5 or less. A lower limit is not particularly limited, and is preferably 2.2 or more. As a specific elastic modulus, which is a value obtained by dividing the Young's modulus of each of the glass plates 73 and 75 by a density, is larger, the rigidity of the glass plate is increased. Specifically, the specific elastic modulus of each of the glass plates 73 and 75 is preferably $2.5\times10^7$ $m^2/s^2$ or more, more preferably $2.8\times10^7$ $m^2/s^2$ or more, and still more preferably $3.0\times10^7$ $m^2/s^2$ or more. An upper limit is not particularly limited, and is preferably $4.0\times10^7$ $m^2/s^2$ or less.

Figure 15:
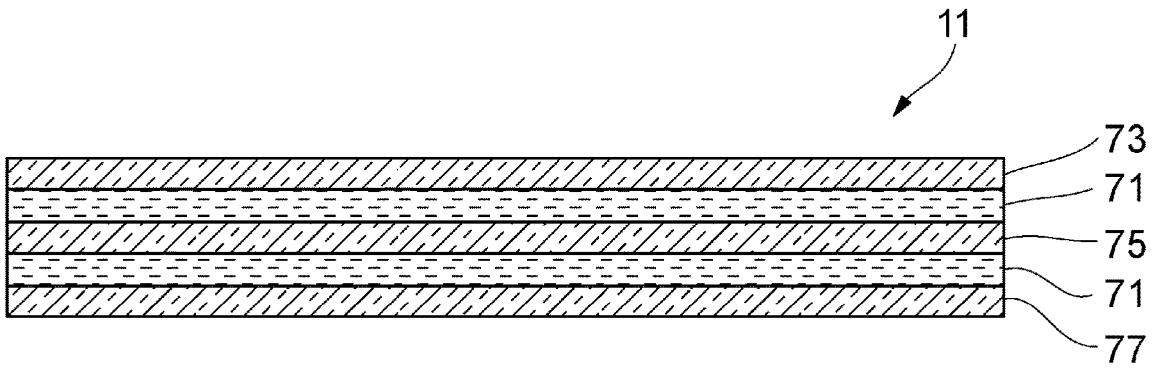
FIG. 15 is a cross-sectional view illustrating another example of the glass sheet composite.

The number of the glass plates constituting the glass sheet composite 11 may be two or more, and as illustrated in FIG. 15, three or more glass plates may be used. In the case of two glass plates, that is, in the case where the glass plate 73 and the glass plate 75 are used, and in the case of three or more glass plates, for example, in the case where the glass plate 73, the glass plate 75, and the glass plate 77 are used, all of the glass plates may have different compositions, all of the glass plates may have the same composition, and glass plates having the same composition and a glass plate having different composition are combined. In particular, it is preferable to use two or more kinds of glass plates having different compositions from the viewpoint of vibration damping. Similarly, the mass and the thickness of the glass plates may be all different, all the same, or partially different. In particular, it is preferable that all the constituent glass plates have the same mass from the viewpoint of vibration damping.

A physically strengthened glass plate or a chemically strengthened glass plate may be used as at least one of the glass plates constituting the glass sheet composite 11. This is useful for preventing breakage of the glass sheet composite 11 made of the glass sheet composite. In the case where it is desired to increase a strength of the glass sheet composite 11, the glass plate positioned on an outermost surface of the glass sheet composite 11 is preferably the physically strengthened glass plate or the chemically strengthened glass plate, and more preferably all the constituent glass plates are the physically strengthened glass plates or the chemically strengthened glass plates.

Using a crystallized glass or a phase-separated glass as the glass plate is also useful from the viewpoint of increasing the longitudinal wave sound velocity value and the strength. In particular, in the case where it is desired to increase the strength of the glass sheet composite 11 made of the glass sheet composite, the glass plate positioned on the outermost surface of the glass sheet composite 11 is preferably the crystallized glass or the phase-separated glass.

The glass sheet composite 11 may form a coating layer 81 illustrated in FIG. 16A and a film 83 illustrated in FIG. 16B on at least one surface of the glass sheet composite as long as the effect of the present disclosure is not impaired. A construction of the coating layer 81 and an application of the film 83 are suitable for, for example, prevention of scattering and prevention of damage. The thickness of the coating layer 81 or the film 83 is preferably ⅕ or less of the plate thickness of a glass plate on a surface layer. A known material in the related art can be used for the coating layer 81 and the film 83, and as the coating layer 81, for example, a water-repellent coating, a hydrophilic coating, a water sliding coating, an oil repellent coating, a light reflection prevention coating, and a heat shielding coating can be used. In addition, as the film 83, for example, a glass scattering prevention film, a color film, a UV cut film, an IR cut film, a heat shielding film, and an electromagnetic wave shield film can be used.

(Sealing Material)

As illustrated in FIG. 17, at least a part of an outer peripheral end surface of the glass sheet composite 11 may be sealed with a sealing material 87 that does not interfere with the vibration of the glass sheet composite 11. As the sealing material 87, a highly elastic rubber, a resin, a gel, or the like can be used.

As illustrated in FIG. 18, in order to prevent peeling at boundaries between the glass plates 73 and 75 of the glass sheet composite 11 and the intermediate layer 71, the sealing material 87 can be applied to at least a part of the surfaces of the glass plates 73 and 75 facing each other as long as the effect of the present disclosure is not impaired. In this case, an area of a sealing material applied portion is preferably 20% or less, more preferably 10% or less, and particularly preferably 5% or less of an area of the intermediate layer 71 so as not to hinder the vibration.

As for a resin used as the sealing material 87, an acrylic-based resin, a cyanoacrylate-based resin, an epoxy-based resin, a silicone-based resin, an urethane-based resin, a phenol-based resin, and the like can be used. Examples of a curing method include a one-liquid type, a two-liquid mixed type, a heat curing, an ultraviolet curing, a visible light curing, and the like. In addition, a thermoplastic resin (a hot melt bond) can also be used as the sealing material 87. Examples thereof include a vinyl ethylene acetate-based resin, a polyolefin-based resin, a polyamide-based resin, a synthetic rubber-based resin, an acrylic resin, and a polyurethane-based resin. As the rubber, for example, a natural rubber, a synthetic natural rubber, a butadiene rubber, a styrene-butadiene rubber, a butyl rubber, a nitrile rubber, an ethylene-propylene rubber, a chloroprene rubber, an acrylic rubber, a chlorosulfonated polyethylene rubber (Hypalon), an urethane rubber, a silicone rubber, a fluororubber, an ethylene-vinyl acetate rubber, an epichlorohydrin rubber, a polysulfide rubber (Thiokol), and a hydrogenated nitrile rubber can be used. In the case where a thickness t of the sealing material 87 is too thin, a sufficient strength cannot be secured, and in the case where the thickness t is too thick, the vibration is hindered. Therefore, the thickness of the sealing material 87 is preferably 10 μm or more and 5 times or less the total thickness of the glass sheet composites, and more preferably 50 μm or more and less than the total thickness of the glass sheet composites.

Each of FIGS. 19A and 19B is a diagram illustrating another embodiment of the glass sheet composite 10. FIG. 19A is a plan view of a glass sheet composite 11, and FIG. 19B is a cross-sectional view along the line XIX-XIX in FIG. 19A. In the glass sheet composite 11 of FIG. 19, a frame 80 is provided on an outer edge of the glass sheet composite 11, and at least on an outermost surface of the glass sheet composite 11. This is a cross-sectional view illustrating another embodiment of the glass sheet composite 11.

In this way, the frame 80 may be provided on at least one outermost surface of the glass sheet composite 11 so long as the effect of the present disclosure is not impaired. The frame 80 is useful, for example, in the case where it is desired to improve the rigidity of the glass sheet composite 11, in the case where the glass sheet composite is firmly held to prevent a low-frequency vibration, or in the case where it is desired to maintain a curved surface shape. A known material in the related art can be used as the material of the frame 80, and examples thereof include metal materials such as aluminum, iron, stainless steel, and magnesium; ceramics such as $Al_2O_3$, SiC, $Si_3N_4$, AlN, mullite, zirconia, yttria, and YAG; single crystal materials; fiber materials such as carbon fibers and Kevlar fibers; other composite materials thereof; organic glass materials and transparent resin materials such as PMMA, PC, PS, PET, and cellulose; rubber materials such as a butyl rubber, a silicone rubber, and an urethane rubber; vibration damping gel materials such as an urethane gel and a silicone gel; and wood materials such as lauan, teak, and plywood.

In order to prevent leakage of the intermediate layer 71 from the frame 80, the sealing material 87 may be provided between the glass sheet composite 11 and the frame.

Each of FIGS. 20A and 20B is a diagram illustrating another embodiment of the glass sheet composite 11. FIG. 20A is a plan view of the glass sheet composite 11, and FIG. 20B is a cross-sectional view along the line XX-XX in FIG. 20A. As illustrated in each of FIGS. 20A and 20B, the frame 80 may be provided on an outermost surface of one glass plate 73 of the glass sheet composite 11.

Each of FIGS. 21A to 21C is a diagram illustrating another embodiment of the glass sheet composite 11. FIG. 21A is a plan view of the glass sheet composite 11, FIG. 21B is a cross-sectional view taken along the line XXI-XXI in FIG. 21A, and FIG. 21C is an enlarged view of the portion C in FIG. 21B.

As illustrated in each of FIGS. 21B and 21C, end surfaces of the first glass plate 73 and the second glass plate 75 are displaced from each other, such that a stepped portion 90 having a stepped shape in a cross-sectional view is formed. Further, in the stepped portion 90, the sealing material 87 is provided to seal at least the intermediate layer 71.

In the stepped portion 90, the sealing material 87 is in close contact with an end surface 73*a* of the first glass plate 73, an end surface 71*a* of the intermediate layer 71, and a main surface 75*a* of the second glass plate 75. With such a configuration, the intermediate layer 71 is sealed by the sealing material 87, leakage of the intermediate layer 71 is prevented, bonding of the first glass plate 73, the intermediate layer 71, and the second glass plate 75 is strengthened, and the strength of the glass sheet composite 11 is increased.

Further, in the configuration, in the stepped portion 90, the end surface 73*a* of the first glass plate 73 and the end surface 71*a* of the intermediate layer 71 are formed to be perpendicular to the main surface 75*a* of the second glass plate 75. As a result, the sealing material 87 has a contour extending in an L shape along the stepped portion 90 in the cross-sectional view. With such a configuration, the bonding of the first glass plate 73, the intermediate layer 71, and the second glass plate 75 is further strengthened, and the strength of the glass sheet composite 11 is further increased.

Further, in the configuration, the sealing material 87 has a tapered surface 87*a*. An edge portion of the glass sheet composite 11 may be subjected to a taper processing or the like. By adopting such a shape of the sealing material 87, it is possible to achieve an effect same as that obtained by processing the glass sheet composite.

Each of FIGS. 22A and 22B is a diagram illustrating another embodiment of the glass sheet composite 11. FIG. 22A is a plan view of the glass sheet composite 11, and FIG. 22B is a cross-sectional view along the line XXII-XXII in FIG. 22A.

In the glass sheet composite 11 according to the configuration, unlike other configuration examples, the stepped portion 90 and the sealing material 87 are not provided on the peripheral edge of the glass sheet composite 11, but are provided substantially at the center of the glass sheet composite 11 in a plan view. Such a configuration also satisfies a requirement that the respective end surfaces of the two glass plates (the first glass plate 73 and the second glass plate 75) are displaced from each other. Accordingly, the strength of the glass sheet composite 11 is increased. A sealing tape 93 is attached to an end surface of the peripheral edge of the glass sheet composite 11 to seal the intermediate layer 71.

The glass sheet composite 11 may have a planar shape, and may have, for example, a curved surface shape that is curved (bent) in accordance with an installation location as illustrated in FIG. 23. Although not illustrated in the drawings, both a portion having the planar shape and a portion having the curved surface shape may be provided. That is, the glass sheet composite 11 may have a three-dimensional shape having a curved portion curved in a concave shape or a convex shape in at least a part thereof. In this way, by forming the three-dimensional shape in accordance with the installation location, an appearance at the installation location can be improved, and designability can be enhanced.

Further, as illustrated in FIG. 24A, in the glass sheet composite 11 in which the stepped portion 90 at the outer edge is sealed with the sealing material 87, the glass sheet composite 11 may be formed in a curved surface shape (a three-dimensional shape) such that a glass plate 75 side is recessed. In this case, an outer edge of the glass plate 75 extends outward from the glass plate 73. Further, as illustrated in FIG. 24B, the glass sheet composite 11 may be formed in a curved surface shape obtained by inverting the shape in FIG. 24A. Also in this case, the outer edge of the glass plate 75 extends outward from the glass plate 73.

Also in the case of these glass sheet composites 11, when viewed from the glass plate 75 side, since the sealing material 87 is disposed on a back side of the glass plate 75, the sealing material 87 can be hidden and cannot be seen from the glass plate 75 side. Accordingly, the appearance at the installation location can be improved, and the designability of the glass sheet composite 11 itself can be further enhanced.

The present disclosure is not limited to the embodiment described above, and combinations of the configurations in the embodiment with each other, modifications and applications by those skilled in the art based on the description of the specification and known techniques are also contemplated by the present disclosure and are included in the scope of protection.

As described above, the following matters are disclosed in the present specification.

(1) A sound insulation device including:

a glass sheet composite including a plurality of glass plates being laminated, including an intermediate layer between at least a pair of glass plates among the glass plates, and partitioning an interior space and an exterior space;

a vibration output unit being fixed to the glass sheet composite and vibrating the glass sheet composite according to an input signal;

an exterior sound detection unit detecting a sound from a noise source or a vibration source and outputting a reference signal according to a detection result, the sound being correlated with a sound wave vibration induced in the glass sheet composite;

an interior sound detection unit detecting a sound in the interior space and outputting an error signal according to a detection result; and a control unit including an adaptive filter that generates a cancel signal having a phase opposite to a phase of the reference signal to minimize the error signal, and outputting the cancel signal from the adaptive filter to the vibration output unit.

According to the sound insulation device, by vibrating the glass sheet composite by the vibration output unit, it is possible to prevent transmission of a noise from an exterior to an interior. Accordingly, a noise in a high-frequency band can be effectively reduced, which is difficult to be canceled by a cancel sound from a speaker in the case where the noise flows into the interior. In addition, since it is possible to prevent the exterior noise itself from flowing through the window, it is possible to reduce the noise in the interior regardless of an interior sound environment. That is, it is possible to prevent the inflow of a noise in a wide frequency band including the high-frequency band through the window, and to form a good interior environment in which the noise is reduced.

(2) The sound insulation device according to (1), in which a loss coefficient of the glass sheet composite at 25° C. is $1\times10^{-2}$ or more, and a longitudinal wave sound velocity value in a plate thickness direction at 25° C. is $4.0\times10^{3}$ m/s or more.

According to the sound insulation device, vibration damping can be enhanced by increasing the loss coefficient, and reproducibility of the sound in a high-frequency range can be improved by increasing the longitudinal wave sound velocity value.

(3) The sound insulation device according to (1) or (2), in which the intermediate layer is a liquid.

According to the sound insulation device, in the case where one glass plate resonates, the other glass plate can be prevented from resonating by the intermediate layer made of the liquid. In addition, a vibration caused by the resonance of the glass plate can be attenuated.

(4) The sound insulation device according to (1) or (2), in which the intermediate layer is a gel body.

According to the sound insulation device, in the case where one glass plate resonates, the other glass plate can be prevented from resonating by the intermediate layer made of the gel body. In addition, a vibration caused by the resonance of the glass plate can be attenuated.

(5) The sound insulation device according to (1) or (2), in which the intermediate layer is one of polyvinyl butyral, an ethylene-vinyl acetate copolymer resin, and polyurethane.

According to the sound insulation device, in the case where one glass plate resonates, the other glass plate can be prevented from resonating by the intermediate layer. In addition, a vibration caused by the resonance of the glass plate can be attenuated.

(6) The sound insulation device according to any one of (1) to (5), further including:

an auxiliary speaker being connected to the control unit and outputting a cancel sound according to the cancel signal.

According to the sound insulation device, a secondary noise generated due to a vibration of the vibration output unit can be canceled by outputting the cancel sound according to the cancel signal transmitted to the vibration output unit from the auxiliary speaker. Accordingly, a noise reduction effect in the interior can be further enhanced.

(7) The sound insulation device according to any one of (1) to (6), in which the glass sheet composite is at least one of a side window of a vehicle, a rear window of a vehicle, a front window of a vehicle, and a roof glazing of a vehicle.

According to the sound insulation device, it is possible to prevent the inflow of a noise from the glass sheet composite provided in the side window, the rear window, the front window, the roof glazing or the like of the vehicle, and it is possible to reduce the noise in the interior.

(8) The sound insulation device according to any one of (1) to (6), in which the glass sheet composite is a window for a house.

According to the sound insulation device, it is possible to prevent the inflow of a noise from the glass sheet composite provided in the window for the house, and it is possible to reduce the noise in the interior of the house.

(9) The sound insulation device according to any one of (1) to (8), further including:

a surrounding member surrounding a region where the vibration output unit is fixed to the glass sheet composite and supporting the glass sheet composite by exposing a region where the vibration output unit is not fixed to the glass sheet composite from an opening to an outside;

a shielding member acoustically shielding between the opening and the glass sheet composite, and dividing the glass sheet composite into an excitation region inside the surrounding member and a vibration region outside the surrounding member; and an internal space sound detection unit being provided inside the surrounding member, detecting a sound generated by the vibration output unit, and outputting the error signal according to a detection result.

According to the sound insulation device, the excitation region of the glass sheet composite in which the vibration output unit is provided is disposed inside the internal space defined by the surrounding member, and is partitioned by the shielding member. By the vibration of the vibration output unit, in the case where the sound is radiated from the glass sheet composite outside the internal space, that is, the vibration region of a portion where one end of the glass sheet composite is exposed to the outside of the internal space from the opening of the internal space, a uniform sound pressure distribution is formed. In addition, leakage of a noise from the internal space can be prevented, and a decrease in directivity can be prevented.

Further, the internal space sound detection unit that detects the sound generated by the vibration output unit and outputs the error signal according to the detection result is provided inside the surrounding member. Therefore, it is possible to output the cancel signal from the control unit such that the error signal from the internal space sound detection unit is minimum. Accordingly, for example, by transmitting the cancel signal to a speaker provided inside the surrounding member or an acoustic speaker in the interior to output the cancel sound, it is possible to cancel the sound generated due to the vibration of the vibration output unit in the internal space of the surrounding member, and it is possible to further enhance the noise reduction effect in the interior.

(10) The sound insulation device according to (9), in which in a case where a direction in which the glass sheet composite protrudes from an inside of an internal space of the surrounding member to the outside is defined as a first direction and a direction orthogonal to the first direction in a plate surface is defined as a second direction, a maximum width of the glass sheet composite in the second direction is equal to or greater than a maximum width of the glass sheet composite in the first direction.

According to the sound insulation device, a distance from the vibration output unit disposed in the excitation region of the glass sheet composite does not become excessively long over the entire surface of the vibration region, and the vibration from the vibration output unit is propagated to the vibration region with a sufficient strength.

(11) The sound insulation device according to (9) or (10), in which a ratio Ss/Sv between an area Ss of the excitation region of the glass sheet composite and an area Sv of the vibration region is 0.01 or more and 1.0 or less.

According to the sound insulation device, it is possible to achieve an efficient excitation driving without reducing efficiency of a sound pressure generation due to an acoustic radiation from the vibration region A2 according to the vibration generated in the vibration output unit.

(12) The sound insulation device according to any one of (9) to (11), in which the glass sheet composite has a total area of 0.01 $m^2$ or more.

According to the sound insulation device, an effect of forming a uniform sound pressure distribution and an effect of preventing a decrease in directivity can be easily obtained by dividing the glass sheet composite into the excitation region and the vibration region.

(13) The sound insulation device according to any one of (9) to (12), further including a support member supporting the glass sheet composite on the surrounding member.

According to the sound insulation device, the glass sheet composite is supported on the surrounding member by the support member.

(14) The sound insulation device according to any one of (9) to (13), in which the glass sheet composite is supported to be relatively movable with respect to the surrounding member.

According to the sound insulation device, by opening and closing a space between the interior and the exterior by relatively moving the glass sheet composite with respect to the surrounding member, a sound insulation effect can be obtained as necessary.

(15) The sound insulation device according to any one of (9) to (14), the shielding member has a storage elastic modulus at 25° C. and a frequency of 1 Hz of $1.0 \times 10^2$ Pa to $1.0 \times 10^{10}$ Pa.

According to the sound insulation device, it is possible to prevent a sound leakage while preventing vibration damping of the glass sheet composite.

(16) The sound insulation device according to any one of (9) to (15), in which the excitation region of the glass sheet composite is formed of a single glass plate.

According to the sound insulation device, the glass sheet composite can be vibrated with a high energy efficiency.

(17) The sound insulation device according to any one of (1) to (16), in which the vibration output unit is disposed at a plurality of locations of the glass sheet composite.

According to the sound insulation device, the vibration in the vibration region can be made more uniform by applying the vibration from a plurality of vibration output units to the glass sheet composite.

(18) The sound insulation device according to any one of (1) to (17), in which the vibration output unit is disposed on only one surface of the glass sheet composite.

According to the sound insulation device, in the case where an arrangement space of the vibration output unit is limited in a thickness direction of the glass sheet composite, the vibration output unit can be disposed efficiently.

(19) The sound insulation device according to any one of (1) to (17), in which the vibration output unit is disposed on both surfaces of the glass sheet composite.

According to the sound insulation device, in the case where the area of the glass sheet composite is limited, the vibration output unit can be disposed efficiently.

(20) The sound insulation device according to any one of (1) to (19), in which the glass sheet composite has a flat plate shape.

According to the sound insulation device, the glass sheet composite can be easily processed, and cost can be reduced.

(21) The sound insulation device according to any one of (1) to (19), in which the glass sheet composite has a curved surface having a concave shape or a convex shape in at least a part of the glass sheet composite.

According to the sound insulation device, a shape of the glass sheet composite can be freely set according to an installation position and an installation purpose of the sound insulation device.

(22) A sound insulation method of vibrating a glass sheet composite according to an input signal, the glass sheet composite including a plurality of glass plates being laminated, including an intermediate layer between at least a pair of glass plates among the glass plates, and partitioning an interior space and an exterior space, the sound insulation method including:

detecting a sound from a noise source or a vibration source and outputting a reference signal according to a detection result, the sound being correlated with a sound wave vibration induced in the glass sheet composite;

detecting a sound in the interior space and outputting an error signal according to a detection result; and generating, by an adaptive filter, a cancel signal having a phase opposite to a phase of the reference signal to minimize the error signal, and vibrating the glass sheet composite according to the cancel signal from the adaptive filter.

According to the sound insulation method, it is possible to prevent transmission of the noise from the exterior to the interior by vibrating the glass sheet composite according to the cancel signal that minimizes the error signal. Accordingly, it is possible to effectively reduce a noise in a high-frequency band (for example, a noise exceeding 150 Hz), which is difficult to be canceled by the cancel sound from the speaker in the case where the noise flows into the interior. In addition, since it is possible to prevent the exterior noise itself from flowing through the window, it is possible to reduce the noise in the interior regardless of an interior sound environment. That is, it is possible to prevent the inflow of a noise in a wide frequency band including the high-frequency band through the window, and to form a good interior environment in which the noise is reduced.

The present application is based on Japanese Patent Application No. 2021-9668 filed on Jan. 25, 2021, the contents of which are incorporated herein by reference.

REFERENCE SIGNS LIST

1: exterior sound detection unit
3: interior sound detection unit
5: control unit
7: acoustic speaker
8: internal space sound detection unit
9: auxiliary speaker
11: glass sheet composite
13: vibration output unit
15: surrounding member
17: shielding member
21: opening
23: support member
35: adaptive filter
71: intermediate layer
73, 75: glass plate
A1: excitation region
A2: vibration region
FSW: front side window (side window)
FW: front window
RG: roof glazing
RW: rear window
S: vehicle
WD: window

What is claimed is:

1. A sound insulation device comprising:

a glass sheet composite comprising a plurality of glass plates being laminated, comprising an intermediate layer between at least a pair of glass plates among the glass plates, and partitioning an interior space and an exterior space;

a vibration output unit being fixed to the glass sheet composite and vibrating the glass sheet composite according to an input signal;

an exterior sound detection unit detecting a sound from a noise source or a vibration source and outputting a reference signal according to a detection result, the sound being correlated with a sound wave vibration induced in the glass sheet composite;

an interior sound detection unit detecting a sound in the interior space and outputting an error signal according to a detection result; and a control unit comprising an adaptive filter that generates a cancel signal having a phase opposite to a phase of the reference signal to minimize the error signal, and outputting the cancel signal from the adaptive filter to the vibration output unit.

2. The sound insulation device according to claim 1, wherein the glass sheet composite has a loss coefficient at 25° C. of $1\times10^{-2}$ or more, and has a longitudinal wave sound velocity value in a plate thickness direction at 25° C. of $4.0\times10^{3}$ m/s or more.

3. The sound insulation device according to claim 1, wherein the intermediate layer is a liquid.

4. The sound insulation device according to claim 1, wherein the intermediate layer is a gel body.

5. The sound insulation device according to claim 1, wherein the intermediate layer is one of polyvinyl butyral, an ethylene-vinyl acetate copolymer resin, and polyurethane.

6. The sound insulation device according to claim 1, further comprising:

an auxiliary speaker being connected to the control unit and outputting a cancel sound according to the cancel signal.

7. The sound insulation device according to claim 1, wherein the glass sheet composite is at least one of a side window of a vehicle, a rear window of a vehicle, a front window of a vehicle, and a roof glazing of a vehicle.

8. The sound insulation device according to claim 1, further comprising:

a surrounding member surrounding a region where the vibration output unit is fixed to the glass sheet composite and supporting the glass sheet composite by exposing a region where the vibration output unit is not fixed to the glass sheet composite from an opening to an outside;

a shielding member acoustically shielding between the opening and the glass sheet composite, and dividing the glass sheet composite into an excitation region inside the surrounding member and a vibration region outside the surrounding member; and an internal space sound detection unit being provided inside the surrounding member, detecting a sound generated by the vibration output unit, and outputting the error signal according to a detection result.

9. The sound insulation device according to claim 8, wherein in a case where a direction in which the glass sheet composite protrudes from an inside of an internal space of the surrounding member to the outside is defined as a first direction and a direction orthogonal to the first direction in a plate surface is defined as a second direction, a maximum width of the glass sheet composite in the second direction is equal to or greater than a maximum width of the glass sheet composite in the first direction.

10. The sound insulation device according to claim 8, wherein a ratio Ss/Sv between an area Ss of the excitation region of the glass sheet composite and an area Sv of the vibration region is 0.01 or more and 1.0 or less.

11. The sound insulation device according to claim 8, wherein the glass sheet composite has a total area of 0.01 $m^2$ or more.

12. The sound insulation device according to claim 8, further comprising a support member supporting the glass sheet composite on the surrounding member.

13. The sound insulation device according to claim 8, wherein the glass sheet composite is supported to be relatively movable with respect to the surrounding member.

14. The sound insulation device according to claim 8, wherein the shielding member has a storage elastic modulus at 25° C. and a frequency of 1 Hz of $1.0\times10^{2}$ Pa to $1.0\times10^{10}$ Pa.

15. The sound insulation device according to claim 8, wherein the excitation region of the glass sheet composite is formed of a single glass plate.

16. The sound insulation device according to claim 1, wherein the vibration output unit is disposed at a plurality of locations of the glass sheet composite.

17. The sound insulation device according to claim 1, wherein the vibration output unit is disposed on only one surface of the glass sheet composite.

18. The sound insulation device according to claim 1, wherein the vibration output unit is disposed on both surfaces of the glass sheet composite.

19. The sound insulation device according to claim 1, wherein the glass sheet composite has a curved surface having a concave shape or a convex shape in at least a part of the glass sheet composite.

20. A sound insulation method of vibrating a glass sheet composite according to an input signal, the glass sheet composite comprising a plurality of glass plates being laminated, comprising an intermediate layer between at least a pair of glass plates among the glass plates, and partitioning an interior space and an exterior space, the sound insulation method comprising:

detecting a sound from a noise source or a vibration source and outputting a reference signal according to a detection result, the sound being correlated with a sound wave vibration induced in the glass sheet composite;

detecting a sound in the interior space and outputting an error signal according to a detection result; and generating, by an adaptive filter, a cancel signal having a phase opposite to a phase of the reference signal to minimize the error signal, and vibrating the glass sheet composite according to the cancel signal from the adaptive filter.

* * * * *